US012772569B2

(12) United States Patent
Jeong

(10) Patent No.: US 12,772,569 B2
(45) Date of Patent: Oct. 20, 2026

(54) LAYOUT DESIGN METHOD AND INTEGRATED CIRCUIT DEVICE MANUFACTURING METHOD USING THE SAME

(71) Applicant: SAMSUNG ELECTRONICS CO., LTD., Suwon-si (KR)

(72) Inventor: Hee Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 537 days.

(21) Appl. No.: 18/389,905

(22) Filed: Dec. 20, 2023

(65) Prior Publication Data

US 2024/0290770 A1 Aug. 29, 2024

(30) Foreign Application Priority Data

Feb. 24, 2023 (KR) ........................ 10-2023-0025287

(51) Int. Cl.

| | |
|---|---|
| ***G06F 30/392*** | (2020.01) |
| ***G06F 30/398*** | (2020.01) |
| ***H10D 89/10*** | (2025.01) |
| ***H10P 76/00*** | (2026.01) |
| ***H10W 46/00*** | (2026.01) |
| *G06F 119/18* | (2020.01) |

(52) U.S. Cl.

CPC ........... *H10D 89/10* (2025.01); *G06F 30/392* (2020.01); *G06F 30/398* (2020.01); *H10P 76/00* (2026.01); *H10W 46/00* (2026.01); *G06F 2119/18* (2020.01); *H10W 46/301* (2026.01)

(58) Field of Classification Search

CPC .. G06F 30/392; G06F 30/398; G06F 2119/18; H10D 89/10; H10W 46/00; H10W 46/31; H10P 76/00

USPC ................................ 716/119, 54, 55; 703/14

See application file for complete search history.

(56) References Cited

U.S. PATENT DOCUMENTS 4,928,160 A * 5/1990 Crafts .................. H10D 84/907 257/211
6,078,073 A * 6/2000 Habu ..................... H10B 12/01 257/E21.654
7,540,970 B2 6/2009 Koh et al.

(Continued)

FOREIGN PATENT DOCUMENTS

CN 105428352 B * 8/2018
CN 110968980 A * 4/2020 ........... G06F 30/392

(Continued)

*Primary Examiner* — Phallaka Kik

(74) *Attorney, Agent, or Firm* — Morgan, Lewis & Bockius LLP

(57) ABSTRACT

A layout design method includes: designing a gate layout including a gate pattern in a first region and a gate alignment key pattern in a second region; designing a contact layout including a contact pattern in a first region and a contact alignment key pattern in a second region; and designing a contact cut layout including a contact cut pattern for cutting a portion of the contact pattern and for cutting a portion of the contact alignment key pattern, wherein the contact alignment key pattern includes a gate-contact overlay pattern that overlaps the gate alignment key pattern, and the contact cut pattern includes a gate-contact overlay cut pattern that overlaps the gate-contact overlay pattern.

20 Claims, 28 Drawing Sheets

S11

(56) References Cited

U.S. PATENT DOCUMENTS

| | | | | |
|---|---|---|---|---|
| 8,078,998 | B2 * | 12/2011 | Haffner | G03F 1/00 716/132 |
| 8,274,099 | B2 * | 9/2012 | Becker | H10D 84/907 257/211 |
| 9,214,347 | B2 | 12/2015 | Yao et al. | |
| 10,332,842 | B2 | 6/2019 | Lee et al. | |
| 10,529,667 | B1 | 1/2020 | Chen et al. | |
| 10,643,888 | B2 | 5/2020 | Kim et al. | |
| 10,804,170 | B2 | 10/2020 | Shen et al. | |
| 11,461,525 | B2 * | 10/2022 | Lee | G06F 21/73 |
| 12,147,156 | B2 * | 11/2024 | Yan | G03F 1/36 |
| 12,433,015 | B2 * | 9/2025 | Lee | H10D 30/6219 |
| 2010/0068652 | A1 * | 3/2010 | Takahata | H10B 10/00 430/311 |
| 2010/0276759 | A1 * | 11/2010 | Haffner | G03F 1/00 257/E27.06 |
| 2012/0220094 | A1 * | 8/2012 | Okuno | H10B 10/12 257/E21.409 |
| 2012/0302059 | A1 * | 11/2012 | Aton | G03F 1/00 438/669 |
| 2015/0106773 | A1 * | 4/2015 | Wang | G03F 1/36 716/53 |
| 2015/0206753 | A1 * | 7/2015 | Yeh | H10P 14/40 438/585 |
| 2016/0035617 | A1 * | 2/2016 | Kim | G03F 7/70633 438/586 |
| 2016/0078164 | A1 * | 3/2016 | Hsieh | G06F 30/392 716/55 |
| 2017/0140986 | A1 * | 5/2017 | Machkaoutsan | G06F 30/394 |
| 2017/0344690 | A1 * | 11/2017 | Haffner | G03F 1/00 |
| 2019/0096811 | A1 * | 3/2019 | Wang | G06F 30/39 |
| 2019/0165125 | A1 * | 5/2019 | Lai | H10D 30/024 |
| 2019/0305096 | A1 * | 10/2019 | Choi | H10B 43/10 |
| 2020/0019672 | A1 * | 1/2020 | Peng | G03F 1/70 |
| 2020/0104461 | A1 * | 4/2020 | Hu | G06F 30/398 |
| 2021/0217861 | A1 * | 7/2021 | Song | H10D 64/258 |
| 2022/0254890 | A1 * | 8/2022 | Chung | H10D 30/481 |
| 2023/0205092 | A1 * | 6/2023 | Lee | G03F 7/70441 716/53 |
| 2023/0223392 | A1 * | 7/2023 | Hsieh | G06F 30/39 716/52 |
| 2023/0297759 | A1 * | 9/2023 | Kuo | G06F 30/398 716/112 |
| 2023/0387256 | A1 * | 11/2023 | Lai | H10D 30/024 |
| 2024/0038762 | A1 * | 2/2024 | Zhuang | H10D 84/85 |

FOREIGN PATENT DOCUMENTS

| | | | | | |
|---|---|---|---|---|---|
| CN | 114019767 | A | * | 2/2022 | H10P 50/73 |
| CN | 116360204 | A | * | 6/2023 | H10P 76/00 |
| DE | 102017125779 | A1 | * | 5/2018 | H10W 20/427 |
| DE | 102018108579 | A1 | * | 11/2018 | H10D 64/013 |
| KR | 20010005118 | A | * | 1/2001 | G03F 9/7076 |
| KR | 10-0640657 | | | 11/2006 | |
| KR | 10-2009-0070688 | | | 7/2009 | |
| KR | 101727804 | B1 | * | 4/2017 | H10P 52/00 |
| KR | 102353067 | B1 | * | 1/2022 | H10W 20/427 |

* cited by examiner

LAYOUT DESIGN METHOD AND INTEGRATED CIRCUIT DEVICE MANUFACTURING METHOD USING THE SAME

CROSS-REFERENCE TO RELATED APPLICATION

This application claims priority under 35 U.S.C. § 119 to Korean Patent Application No. 10-2023-0025287, filed on Feb. 24, 2023, in the Korean Intellectual Property Office, the disclosure of which is incorporated by reference herein in its entirety.

TECHNICAL FIELD

The present inventive concept relates to a layout design method and an integrated circuit device manufacturing method using the layout design method, and more particularly, to a method of designing a layout including key patterns and an integrated circuit device manufacturing method using the layout design method.

DISCUSSION OF THE RELATED ART

Recently, as the down-scaling of integrated circuit devices rapidly progresses, integrated circuit devices are becoming more desirable to have relatively high operational speed but also high operational accuracy. Therefore, it is desirable to develop techniques for stably securing an insulation distance between wires and contacts arranged within a relatively small area and increasing the reliability of integrated circuit devices.

SUMMARY

According to an embodiment of the present inventive concept, a layout design method includes: designing a gate layout including a gate pattern in a first region and a gate alignment key pattern in a second region; designing a contact layout including a contact pattern in a first region and a contact alignment key pattern in a second region; and designing a contact cut layout including a contact cut pattern for cutting a portion of the contact pattern and for cutting a portion of the contact alignment key pattern, wherein the contact alignment key pattern includes a gate-contact overlay pattern that overlaps the gate alignment key pattern, and the contact cut pattern includes a gate-contact overlay cut pattern that overlaps the gate-contact overlay pattern.

According to an embodiment of the present inventive concept, an integrated circuit device manufacturing method includes: designing a layout; fabricating a photomask by using the designed layout; and forming a gate alignment key and a contact alignment key on a substrate by using the photomask, wherein the designing of the layout includes: designing a gate layout including a gate alignment key pattern; designing a contact layout including a contact alignment key pattern; and designing a contact cut layout including a contact cut pattern for cutting a portion of the contact alignment key pattern, and wherein the contact alignment key pattern includes a gate-contact overlay pattern that overlaps the gate alignment key pattern, and the contact cut pattern includes a gate-contact overlay cut pattern that overlaps the gate-contact overlay pattern.

According to an embodiment of the present inventive concept, an integrated circuit device manufacturing method includes: designing a layout; forming a gate alignment key in a key region of a substrate by using the designed layout, wherein the substrate includes a chip region and the key region adjacent to the chip region; and forming a contact alignment key in the key region of the substrate by using the designed layout, wherein the designing of the layout includes: designing a gate layout including a gate pattern in a first region, which corresponds to the chip region, and a gate alignment key pattern in a second region, which corresponds to the key region; designing a contact layout including a contact pattern in a first region, which corresponds to the chip region, and a contact alignment key pattern in a second region, which corresponds to the key region; and designing a contact cut layout including a contact cut pattern for cutting a portion of the contact pattern and for cutting a portion of the contact alignment key pattern, wherein the contact alignment key pattern includes a gate-contact overlay pattern that overlaps the gate alignment key pattern, wherein the contact cut pattern includes a gate-contact overlay cut pattern that overlaps the gate-contact overlay pattern, and wherein the forming of the contact alignment key includes: forming a first mask in the key region of the substrate by using the contact alignment key pattern of the contact layout; and forming a contact cut block in the key region of the substrate by using the contact cut layout, and wherein the first mask includes a first hole, which overlaps the gate alignment key in a vertical direction, and a second hole, which does not overlap the gate alignment key in the vertical direction, and at least a portion of the contact cut block is formed in the first hole to form a second mask.

BRIEF DESCRIPTION OF THE DRAWINGS

The above and other aspects of the present inventive concept will become more apparent by describing in detail embodiments thereof, with reference to the accompanying drawings, in which.

DETAILED DESCRIPTION OF THE EMBODIMENTS

Figure 1:
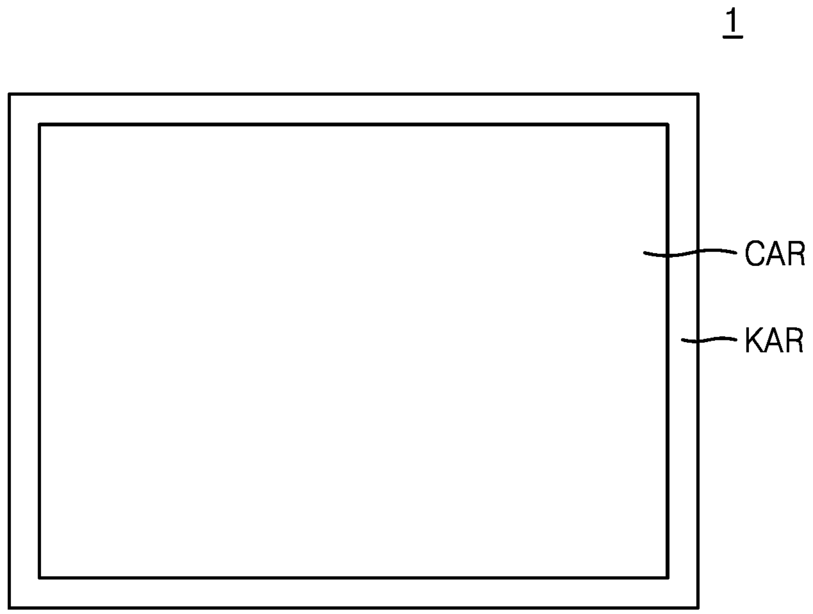
FIG. 1 is a diagram illustrating a chip region and a key region of an integrated circuit device according to some embodiments of the present inventive concept.

Hereinafter, embodiments of the present inventive concept will be described with reference to the accompanying drawings. In the drawings, like reference numerals may denote like elements throughout the specification and the drawings, and overlapping descriptions thereof may be omitted or briefly discussed.

Figure 2:
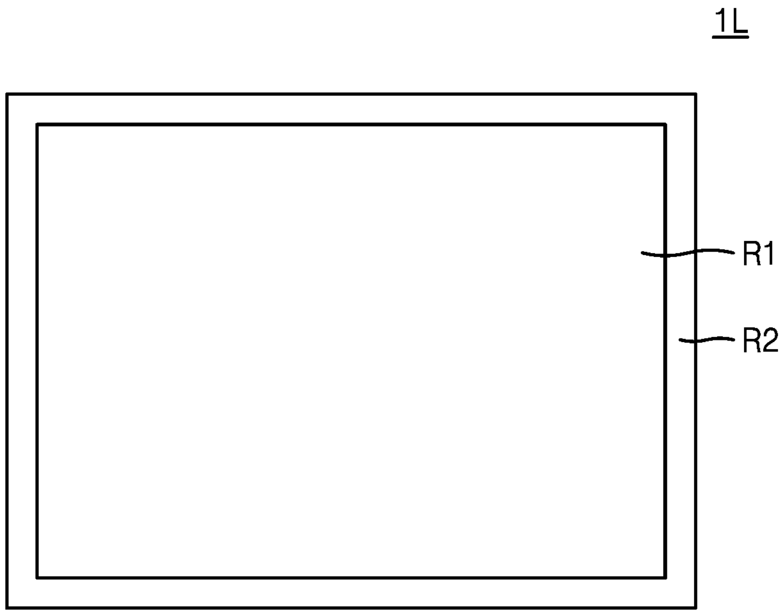
FIG. 2 is a diagram illustrating a first region and a second region of a layout according to some embodiments of the present inventive concept.

FIG. 1 is a diagram illustrating a chip region CAR and a key region KAR of an integrated circuit device 1 according to some embodiments of the present inventive concept. FIG. 2 is a diagram illustrating a first region R1 and a second region R2 of a layout 1L according to some embodiments of the present inventive concept.

Referring to FIG. 1, the integrated circuit device 1 may include the chip region CAR and the key region KAR. The key region KAR may be adjacent to the chip region CAR. The chip region CAR may include one of a plurality of semiconductor chips formed on a semiconductor wafer. The chip region CAR may include: a cell region in which memory cells are formed; and a peripheral circuit region in which peripheral circuits configured to control the memory cells are formed. For example, the chip region CAR may include transistors, diodes, and/or resistors. The key region KAR may include alignment keys provided around the chip region CAR.

Referring to FIG. 2, the layout 1L may include the first region R1 and the second region R2. The first region R1 may correspond to the chip region CAR of the integrated circuit device 1 described with reference to FIG. 1. For example, the first region R1 may be a region in which a layout for forming components of the cell region and the peripheral circuit region of the integrated circuit device 1 is drawn. For example, the first region R1 may include gate patterns, contact patterns, and contact cut patterns that are to be transferred to the chip region CAR of the integrated circuit device 1. The second region R2 may correspond to the key region KAR of the integrated circuit device 1 described with reference to FIG. 1. For example, the second region R2 may be a region in which a layout for forming the alignment keys is drawn. For example, the second region R2 may include gate alignment key patterns, contact alignment key patterns, and contact cut patterns that are to be transferred to the key region KAR of the integrated circuit device 1.

Figure 3:
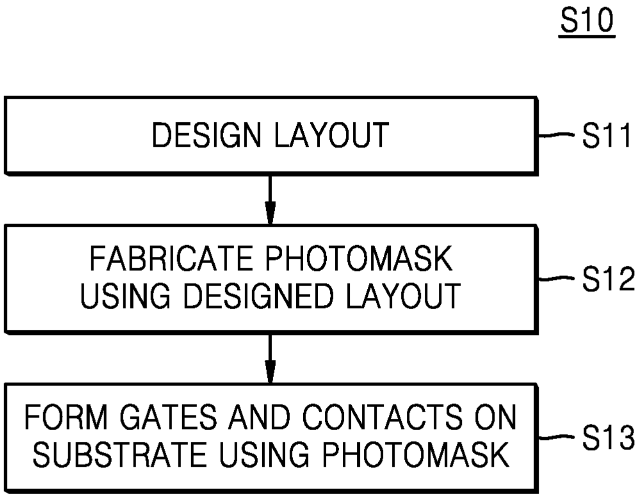
FIG. 3 is a flowchart illustrating an integrated circuit device manufacturing method according to some embodiments of the present inventive concept.
Figure 4:
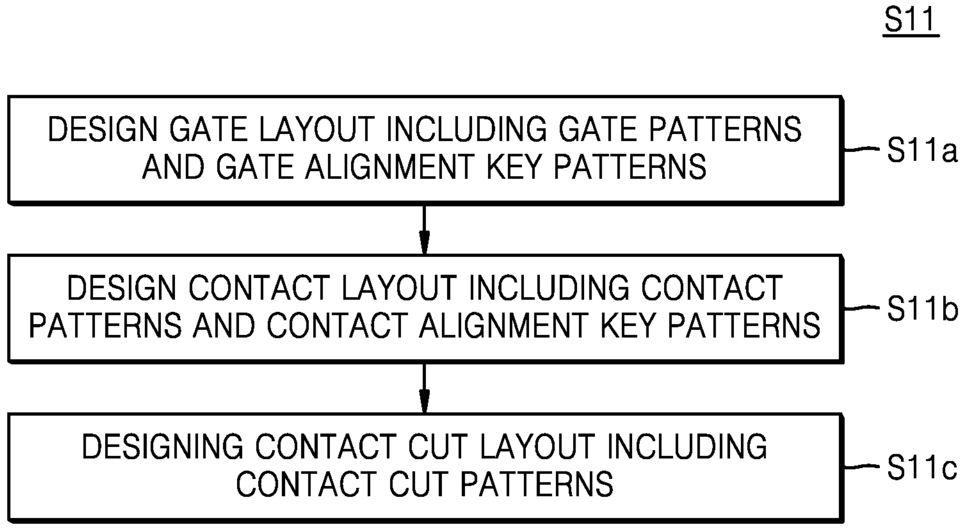
FIG. 4 is a flowchart illustrating a layout design method according to some embodiments of the present inventive concept.

FIG. 3 is a flowchart illustrating an integrated circuit device manufacturing method S10 according to some embodiments of the present inventive concept. FIG. 4 is a flowchart illustrating a layout design method S11 according to some embodiments of the present inventive concept.

Figure 5A:
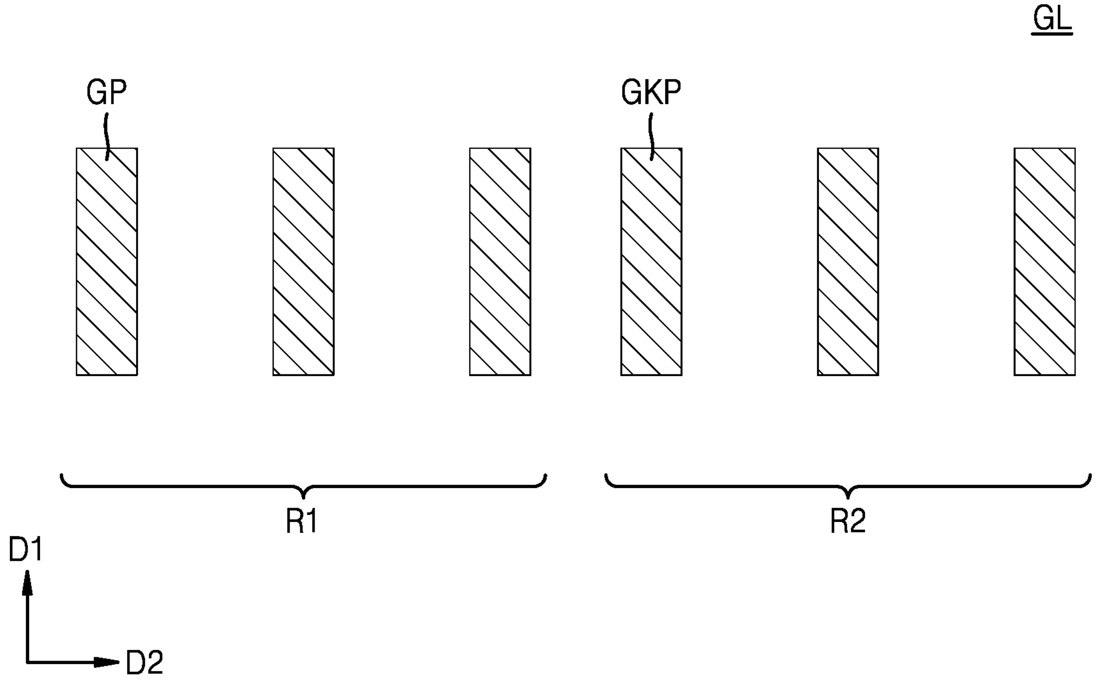
FIGS. 5A, 5B and 5C are diagrams illustrating a layout design method according to some embodiments of the present inventive concept.
Figure 5B:
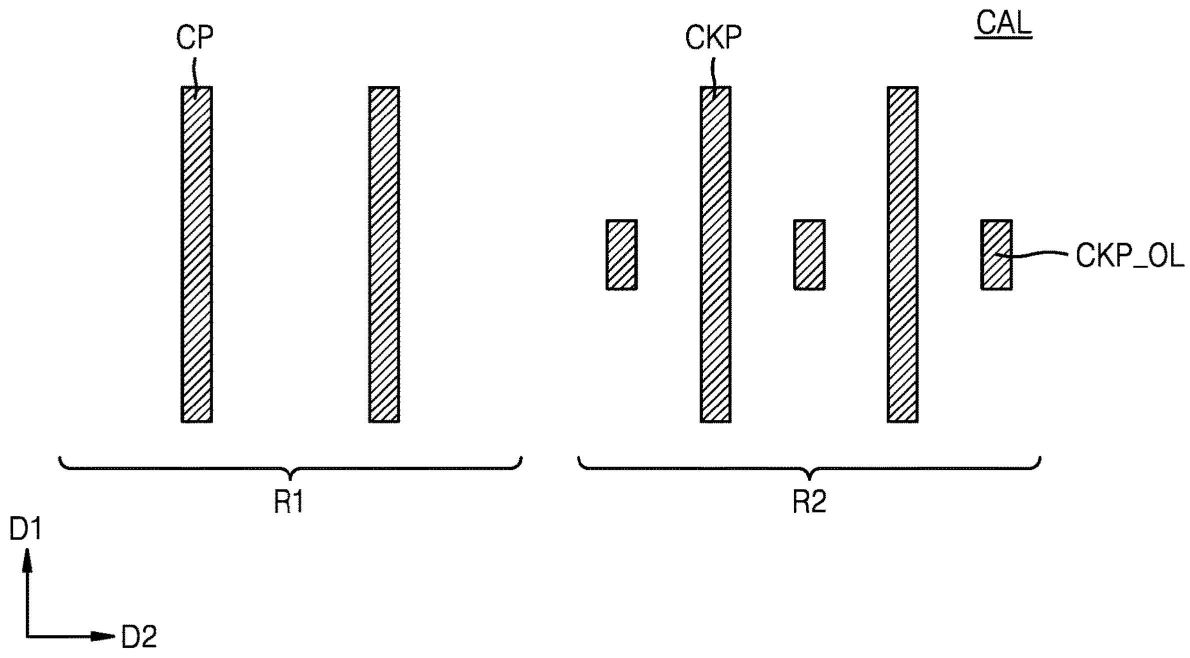
Figure 5C:
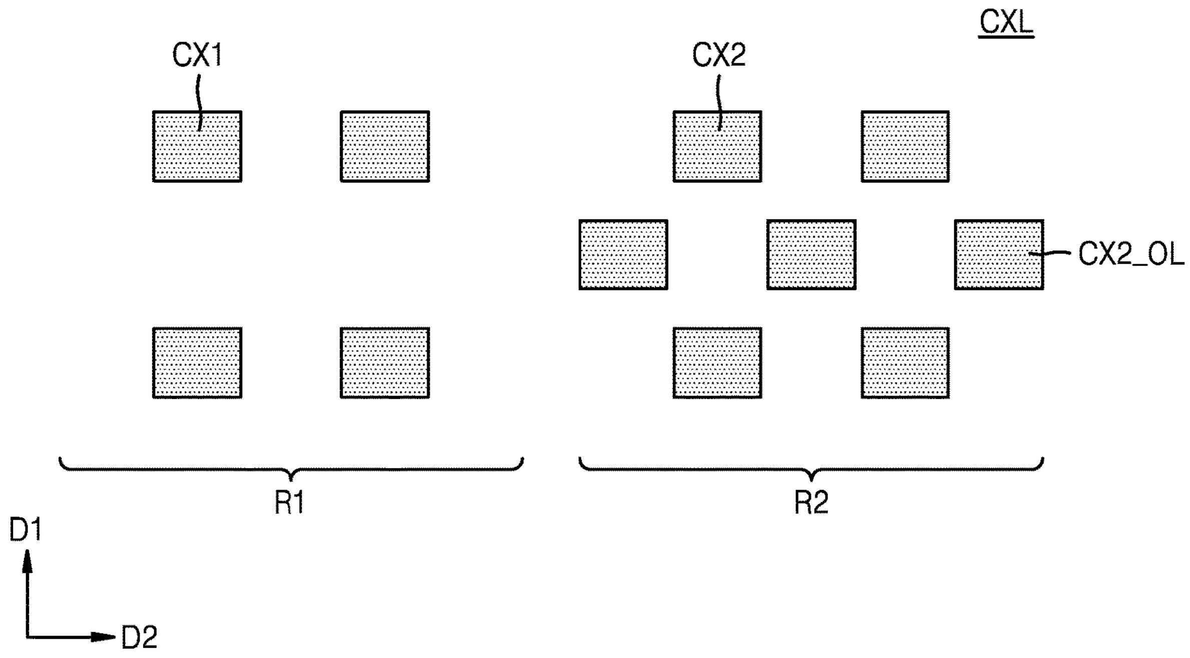
Figure 6:
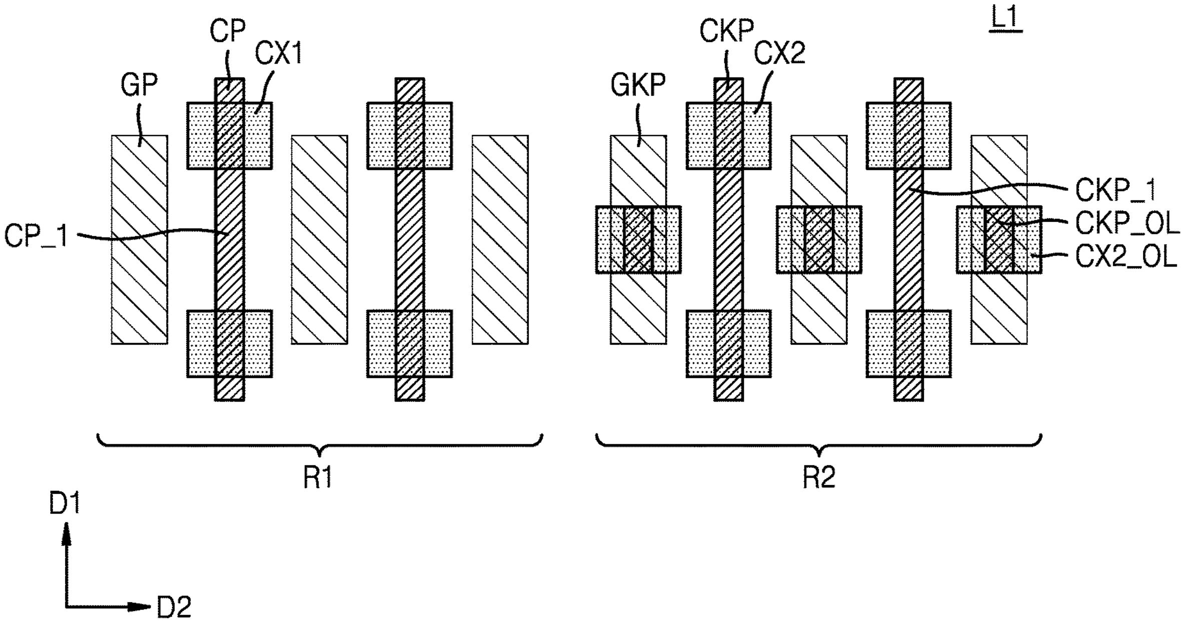
FIG. 6 is a diagram illustrating a layout designed by a layout design method according to some embodiments of the present inventive concept.

FIG. 5A to 5C are diagrams illustrating the layout design method S11 (refer to FIGS. 3 and 4) according to some embodiments of the present inventive concept. For example, FIG. 5A is a diagram illustrating a gate layout GL. For example, FIG. 5B is a diagram illustrating a contact layout CAL. For example, FIG. 5C is a diagram illustrating a contact cut layout CXL. FIG. 6 is a diagram illustrating a layout designed by the layout design method S11 according to some embodiments of the present inventive concept. For example, FIG. 6 illustrates a layout L1 prepared by superimposing the gate layout GL, the contact layout CAL, and the contact cut layout CXL of FIGS. 5A to 5C on each other.

Referring to FIG. 3, the integrated circuit device manufacturing method S10 of the embodiments may include designing a layout (operation S11), fabricating a photomask using the designed layout (operation S12), and forming gates and contacts on a substrate using the photomask (operation S13).

For example, referring to FIG. 4, operation S11 of designing a layout may include designing a gate layout including gate patterns and gate alignment key patterns (operation S11*a*), designing a contact layout including contact patterns and contact alignment key patterns (operation S11*b*), and designing a contact cut layout including contact cut patterns (operation S11*c*). Hereinafter, operation S11 of designing a layout according to the integrated circuit device manufacturing method S10 will be described with reference to FIGS. 5A to 5C.

Referring to FIGS. 4 and 5A together, operation S11*a* of designing a gate layout GL may be performed. For example, the gate layout GL may include gate patterns GP in a first region R1 and gate alignment key patterns GKP in a second region R2.

In some embodiments of the present inventive concept, the first region R1 and the second region R2 of the gate layout GL may respectively correspond to the first region R1 and the second region R2 of the layout 1L described with reference to FIG. 2. For example, the first region R1 and the second region R2 of the gate layout GL may respectively correspond to the chip region CAR and the key region KAR of the integrated circuit device 1 described with reference to FIG. 1.

In some embodiments of the present inventive concept, the gate patterns GP may be transferred to the chip region CAR of the integrated circuit device 1 to form gates. In some embodiments of the present inventive concept, the gate alignment key patterns GKP may be transferred to the key region KAR of the integrated circuit device 1 to form gate alignment keys.

In some embodiments of the present inventive concept, the gate patterns GP and the gate alignment key patterns GKP may extend in a first direction D1. In some embodiments of the present inventive concept, the gate patterns GP and the gate alignment key patterns GKP may be spaced apart from each other in a second direction D2.

Thereafter, referring to FIG. 5B, operation S11*b* of designing a contact layout CAL may be performed. For example, the contact layout CAL may include contact patterns CP in a first region R1 and a contact alignment key patterns CKP in a second region R2. In some embodiments of the present inventive concept, the first region R1 and the second region R2 of the contact layout CAL may respectively correspond to the first region R1 and the second region R2 of the layout 1L described with reference to FIG. 2. For example, the first region R1 and the second region R2 of the contact layout CAL may respectively correspond to the chip region CAR and the key region KAR of the integrated circuit device 1 described with reference to FIG. 1.

In some embodiments of the present inventive concept, the contact patterns CP may be transferred to the chip region CAR of the integrated circuit device 1 to form contacts. In some embodiments of the present inventive concept, the contact alignment key patterns CKP may be transferred to the key region KAR of the integrated circuit device 1 to form contact alignment keys.

In some embodiments of the present inventive concept, portions of the contact alignment key patterns CKP may overlap the gate alignment key patterns GKP (refer to FIG. 5A) of the gate layout GL (refer to FIG. 5A). For example, the contact alignment key patterns CKP may include gate-contact overlay patterns CKP_OL overlapping the gate alignment key patterns GKP. In some embodiments of the present inventive concept, the contact patterns CP might not overlap the gate patterns GP of the gate layout GL (refer to FIG. 5A).

In some embodiments of the present inventive concept, the contact patterns CP and the contact alignment key patterns CKP may extend in the first direction D1. In some embodiments of the present inventive concept, the contact patterns CP and the contact alignment key patterns CKP may be spaced apart from each other in the second direction D2. For example, the gate-contact overlay patterns CKP_OL may extend in the first direction D1 and may be spaced apart from each other in the second direction D2.

In some embodiments of the present inventive concept, the gate-contact overlay patterns CKP_OL may be arranged alternately with the contact alignment key patterns CKP that do not overlap the gate alignment key patterns GKP. In some embodiments of the present inventive concept, the lengths of the gate-contact overlay patterns CKP_OL in the first direction D1 may be less than the lengths of the contact alignment key patterns CKP that do not overlap the gate alignment key patterns GKP.

In some embodiments of the present inventive concept, unlike illustrated in FIG. 5B, the gate-contact overlay patterns CKP_OL might not be arranged to alternate with the contact alignment key patterns CKP that do not overlap the gate alignment key patterns GKP. In some embodiments of the present inventive concept, unlike illustrated in FIG. 5B, in the first direction D1, the lengths of the gate-contact overlay patterns CKP_OL may be substantially equal to the lengths of the contact alignment key patterns CKP that do not overlap the gate alignment key patterns GKP.

Next, referring to FIG. 5C, operation S11c of designing a contact cut layout CXL may be performed. For example, the contact cut layout CXL may include contact cut patterns CX1 and CX2 for cutting portions of the contact patterns CP (refer to FIG. 5B) and portions of the contact alignment key patterns CKP (refer to FIG. 5B) of the contact layout CAL (refer to FIG. 5B).

In some embodiments of the present inventive concept, a first region R1 and a second region R2 of the contact cut layout CXL may respectively correspond to the first region R1 and the second region R2 of the layout 1L described with reference to FIG. 2. For example, the first region R1 and the second region R2 of the contact cut layout CXL may respectively correspond to the chip region CAR and the key region KAR of the integrated circuit device 1 described with reference to FIG. 1.

In some embodiments of the present inventive concept, the contact cut patterns CX1 and CX2 may include first contact cut patterns CX1 that is in the first region R1 and second contact cut patterns CX2 that is in the second region R2. For example, the first contact cut patterns CX1 may cut portions of the contact patterns CP, and the second contact cut patterns CX2 may cut portions of the contact alignment key patterns CKP. For example, the first contact cut patterns CX1 may overlap portions of the contact patterns CP, and the second contact cut patterns CX2 may overlap portions of the contact alignment key patterns CKP. For example, the second contact cut patterns CX2 may include gate-contact overlay cut patterns CX2_OL that overlap the gate-contact overlay patterns CKP_OL (refer to FIG. 5B). For example, the gate-contact overlay cut patterns CX2_OL may cut the gate-contact overlay patterns CKP_OL.

In some embodiments of the present inventive concept, the first contact cut patterns CX1 may be spaced apart from each other in the first direction D1 and/or the second direction D2. In some embodiments of the present inventive concept, the second contact cut patterns CX2 may be spaced apart from each other in the first direction D1 and/or the second direction D2. For example, the gate-contact overlay cut patterns CX2_OL may be spaced apart from each other in the second direction D2.

In some embodiments of the present inventive concept, operation S11 of designing a layout may further include copying and pasting the gate-contact overlay patterns CKP_OL to the contact cut layout CXL. For example, operation S11 of designing a layout may further include copying and pasting the gate-contact overlay patterns CKP_OL to positions of the contact cut layout CXL that overlap the gate-contact overlay patterns CKP_OL. For example, operation S11c of designing the contact cut layout CXL may further include forming the gate-contact overlay cut patterns CX2_OL by copying and pasting the gate-contact overlay patterns CKP_OL to positions of the contact cut layout CXL that overlap the gate-contact overlay patterns CKP_OL.

Referring to FIGS. 5A to 5C and FIG. 6 together, the gate layout GL, the contact layout CAL, and the contact cut layout CXL may overlap each other. In some embodiments of the present inventive concept, the first regions R1 and the second regions R2 of the gate layout GL, the contact layout CAL, and the contact cut layout CXL may correspond to each other.

In some embodiments of the present inventive concept, the gate patterns GP and the contact patterns CP might not overlap each other in the first region R1 of the layout L1. In some embodiments of the present inventive concept, the first contact cut patterns CX1 may overlap portions of the contact patterns CP to cut the contact patterns CP. For example, only first portions CP_1 of the contact patterns CP that do not overlap the first contact cut patterns CX1 may be used to form contacts in a subsequent process.

According to some embodiments of the present inventive concept, in the second region R2 of the layout L1, the gate alignment key patterns GKP and the contact alignment key patterns CKP may overlap each other. For example, the contact alignment key patterns CKP may include the gate-contact overlay patterns CKP_OL that overlap the gate alignment key patterns GKP. In some embodiments of the present inventive concept, the gate-contact overlay patterns CKP_OL may overlap portions of the gate alignment key patterns GKP. For example, the lengths of the gate-contact overlay patterns CKP_OL in the first direction D1 may be less than the lengths of the gate alignment key patterns GKP in the first direction D1. In addition, unlike illustrated in FIG. 6, the lengths of the gate-contact overlay patterns CKP_OL in the first direction D1 may be equal to the lengths of the gate alignment key patterns GKP in the first direction D1.

According to some embodiments of the present inventive concept, in the second region R2 of the layout L1, the second contact cut patterns CX2 may overlap portions of the contact alignment key patterns CKP to cut the contact alignment key patterns CKP. For example, the gate-contact overlay cut patterns CX2_OL may overlap the gate-contact overlay patterns CKP_OL to cut the gate-contact overlay patterns CKP_OL. For example, only first portions CKP_1 of the contact alignment key patterns CKP that do not overlap the second contact cut patterns CX2 may form contact alignment keys in a subsequent process. For example, the gate-contact overlay patterns CKP_OL might not be used to form contact alignment keys in a subsequent process. In other words, contact alignment keys might not be formed at positions overlapping the gate alignment key patterns GKP.

According to some embodiments of the present inventive concept, in the first region R1 and the second region R2 of the layout L1, the contact cut patterns CX1 and CX2 may have lengths and widths for sufficiently cutting the contact patterns CP and the contact alignment key patterns CKP. For example, the widths of the contact cut patterns CX1 and CX2 in the second direction D2 may be greater than or equal to the widths of the contact patterns CP and the contact alignment key patterns CKP in the second direction D2. For example, the widths of the gate-contact overlay cut patterns CX2_OL in the second direction D2 may be greater than the widths of the gate-contact overlay patterns CKP_OL in the second direction D2. For example, the lengths of the gate-contact overlay cut patterns CX2_OL in the first direction D1 may be greater than or equal to the lengths of the gate-contact overlay patterns CKP_OL in the first direction D1.

Figure 7:
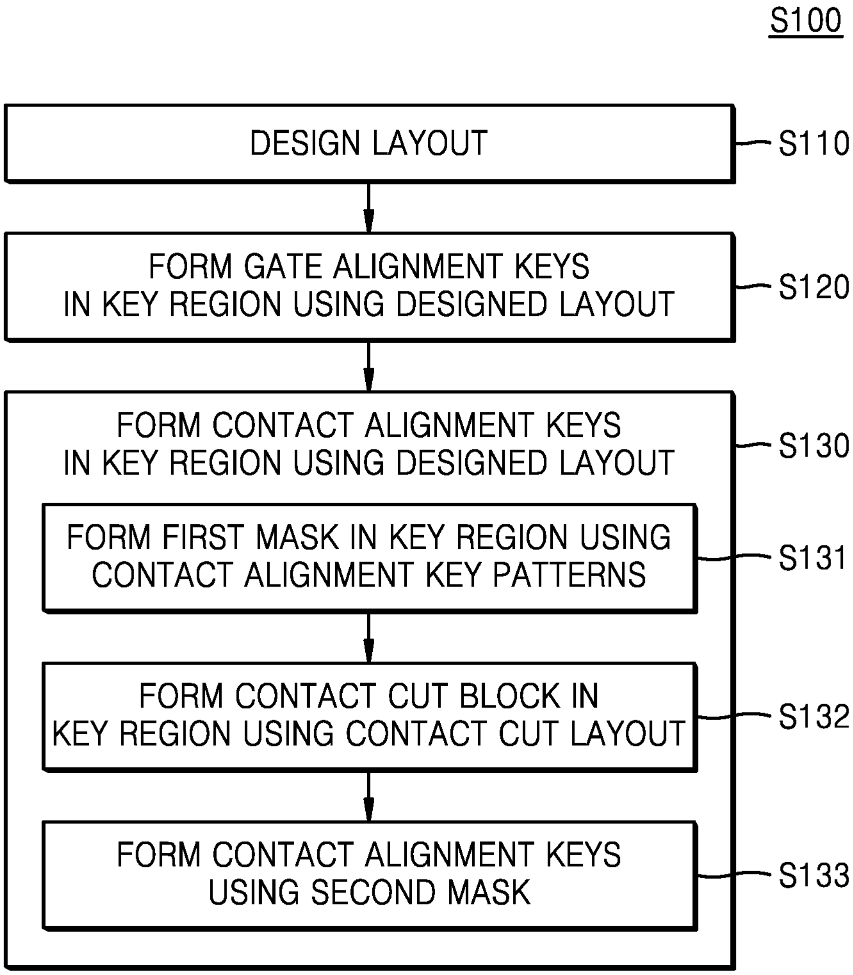
FIG. 7 is a flowchart illustrating an integrated circuit device manufacturing method according to some embodiments of the present inventive concept.
Figure 8:
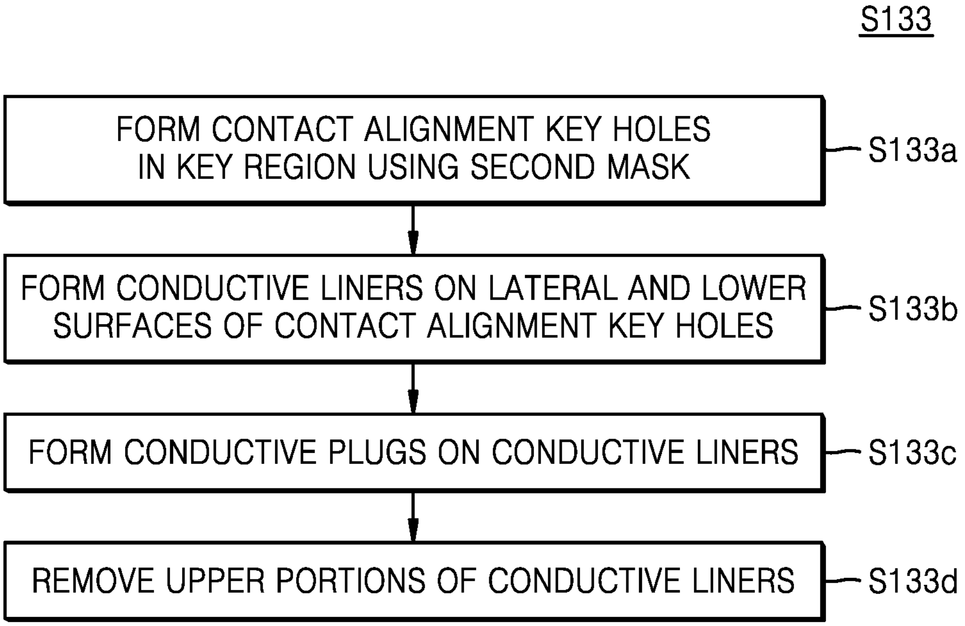
FIG. 8 is a flowchart illustrating some operations of an integrated circuit device manufacturing method according to some embodiments of the present inventive concept.

FIG. 7 is a flowchart illustrating an integrated circuit device manufacturing method S100 according to some embodiments of the present inventive concept. FIG. 8 is a flowchart illustrating some operations of the integrated circuit device manufacturing method S100 according to some embodiments of the present inventive concept. For example, FIG. 8 is a flowchart illustrating operation S133 of forming contact alignment keys in the integrated circuit device manufacturing method S100.

Figure 9:
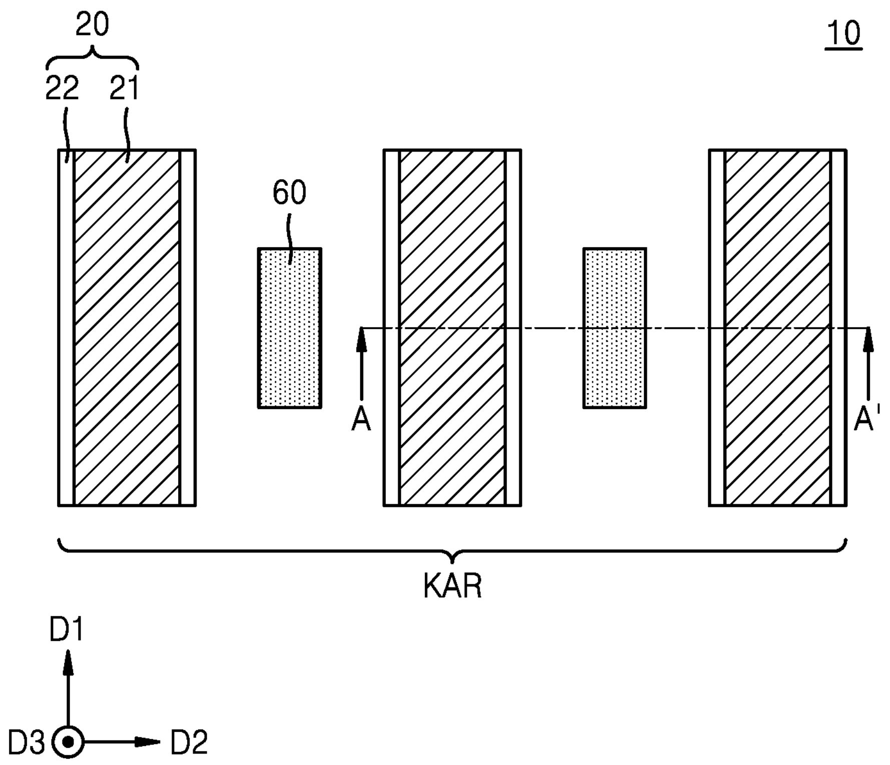
FIG. 9 is a layout diagram illustrating a portion of an integrated circuit device manufactured by an integrated circuit device manufacturing method according to some embodiments of the present inventive concept.

FIG. 9 is a layout diagram illustrating a portion of an integrated circuit device 10 manufactured by an integrated circuit device manufacturing method according to some embodiments of the present inventive concept. FIGS. 10A to 10G are cross-sectional views illustrating an integrated circuit device manufacturing method S100 according to some embodiments of the present inventive concept. For example, FIGS. 10A to 10G are cross-sectional views corresponding to a cross-section taken along line A-A' of FIG. 9.

Referring to FIG. 7, operation S110 of designing a layout may be performed. Operation S110 of designing a layout may include operation S1 of designing a layout which is described with reference to FIGS. 3 and 4. For example, operation S110 of designing a layout may include: operation S11*a* of designing a gate layout including gate patterns and gate alignment key patterns; operation S11*b* of designing a contact layout including contact patterns and contact alignment key patterns; and operation S11*c* of designing a contact cut layout including contact cut patterns. For example, a layout designed in operation S110 may include the layout L1 described with reference to FIGS. 5A to 5C and FIG. 6.

Referring to FIG. 9, the integrated circuit device 10 may include gate alignment keys 20 arranged in a key region KAR and extending in a first direction D1. The gate alignment keys 20 may be spaced apart from each other in a second direction D2. The integrated circuit device 10 may further include contact alignment keys 60 arranged alternately with the gate alignment keys 20 in the second direction D2. The contact alignment keys 60 might not overlap the gate alignment keys 20 in a third direction D3.

Figure 10A:
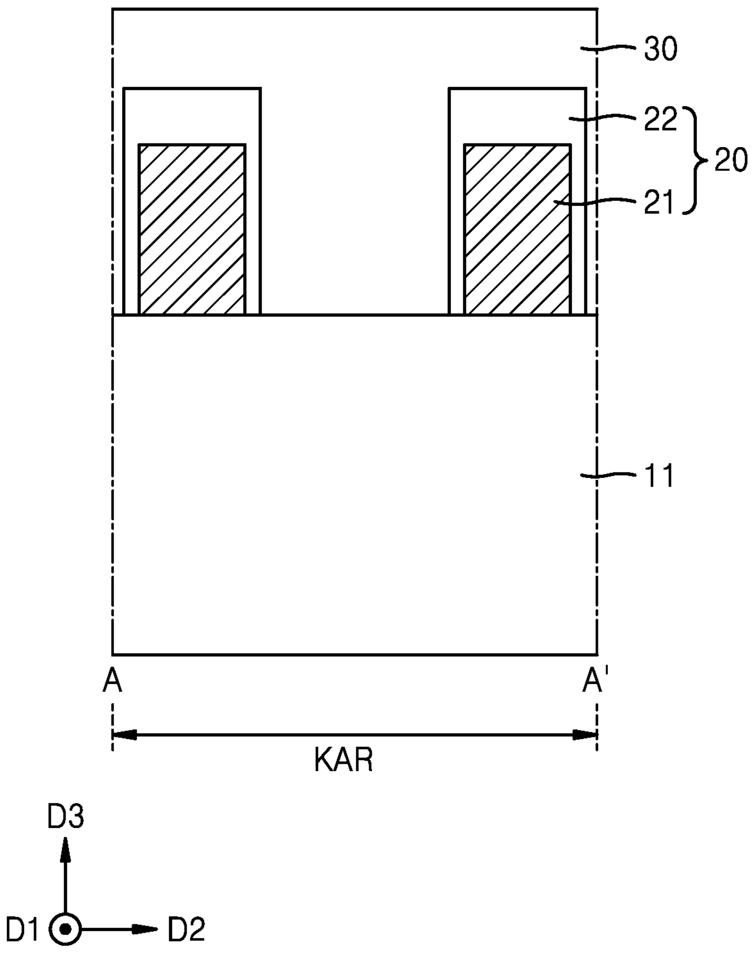
FIGS. 10A, 10B, 10C, 10D, 10E, 10F, and 10G are cross-sectional views illustrating an integrated circuit device manufacturing method according to some embodiments of the present inventive concept.

Referring to FIGS. 7 and 10A together, operation S120 of forming the gate alignment keys 20 in the key region KAR using the designed layout may be performed. For example, operation S120 of forming the gate alignment keys 20 may include the following: fabricating a photomask using the gate layout GL (refer to FIGS. 5A and 6); and forming the gate alignment keys 20 on a substrate 11 by using the photomask. For example, the photomask may be fabricated by transferring the gate alignment key patterns GKP (refer to FIGS. 5A and 6) of the gate layout GL, and the gate alignment keys 20 may be formed on the substrate 11 by using the photomask. In some embodiments of the present inventive concept, the forming of the gate alignment keys 20 may include forming conductive patterns 21, which extend in the first direction D1 and are spaced apart from each other in the second direction D2, and insulating patterns 22, which surround the conductive patterns 21.

In some embodiments of the present inventive concept, the substrate 11 may include a semiconductor such as Si or Ge, or a compound semiconductor such as SiGe, SiC, GaAs, InAs, InGaAs, or InP. Herein, each of the terms "SiGe," "SiC," "GaAs," "InAs," "InGaAs," and "InP" refers to a material including elements in the term and does not refer to a chemical formula expressing a stoichiometric relationship.

In some embodiments of the present inventive concept, the conductive patterns 21 may include a metal, a metal nitride, a metal carbide, or a combination thereof. The metal may include at least one of, for example, Ti, W, Ru, Nb, Mo, Hf, Ni, Co, Pt, Yb, Tb, Dy, Er, and Pd. The metal nitride may include at least one of, for example, TiN and TaN. The metal carbide may be, for example, TiAlC. However, the material of the conductive patterns 21 is not limited to the materials listed above.

In some embodiments of the present inventive concept, the insulating patterns 22 may have a structure in which an interface dielectric layer and a high-k dielectric layer are stacked. The interface dielectric layer may include a low-k material layer having a dielectric constant of about 9 or less, for example, a silicon oxide layer, a silicon oxynitride layer, or a combination thereof. In some embodiments of the present inventive concept, the interface dielectric layer may be omitted. The high-k dielectric layer may include a material having a dielectric constant greater than the dielectric constant of the silicon oxide layer. For example, the high-k dielectric layer may have a dielectric constant of about 10 to about 25. The high-k dielectric layer may include, for example, hafnium oxide, but is not limited thereto.

In some embodiments of the present inventive concept, an operation of forming gates in the chip region CAR (refer to FIG. 1) may also be performed. For example, the gate patterns GP (refer to FIGS. 5A and 6) of the gate layout GL may be transferred to fabricate a photomask, and gates may be formed in a chip region CAR of the substrate 11 using the photomask. The operation of forming gates may include forming gate electrodes extending in the first direction D1 and separate from each other in the second direction D2, and gate insulating layers at least partially surrounding the gate electrodes. In some embodiments of the present inventive concept, the gate electrodes may include the same material as the conductive patterns 21. For example, the gate electrodes may include a metal, a metal nitride, a metal carbide, or a combination thereof. In some embodiments of the present inventive concept, the gate insulating layers may include the same material as the insulating patterns 22. For example, the gate insulating layers may include dielectric layers.

Thereafter, an interlayer insulating layer 30 at least partially surrounding the gate alignment keys 20 may be formed on the substrate 11. For example, the interlayer insulating layer 30 may be formed on the gate alignment keys 20. An interlayer insulating layer surrounding the gates of the chip region CAR may also be formed. In some embodiments of the present inventive concept, the interlayer insulating layer 30 may include silicon nitride (SiN), silicon oxide (SiO), SiCN, SiBN, SiON, SiOCN, SiBCN, SiOC, or a combination thereof.

Referring to FIGS. 7 and 10B to 10G together, operation S130 of forming the contact alignment keys 60 in the key region KAR using the designed layout may be performed. For example, operation S130 of forming the contact alignment keys 60 may include: an operation (refer to FIGS. 10B and 10C) of fabricating a photomask using the contact layout CAL (refer to FIGS. 5B and 6); and an operation (FIGS. 10D to 10G) of forming the contact alignment keys 60 on the substrate 11 by using the photomask.

Figure 10B:
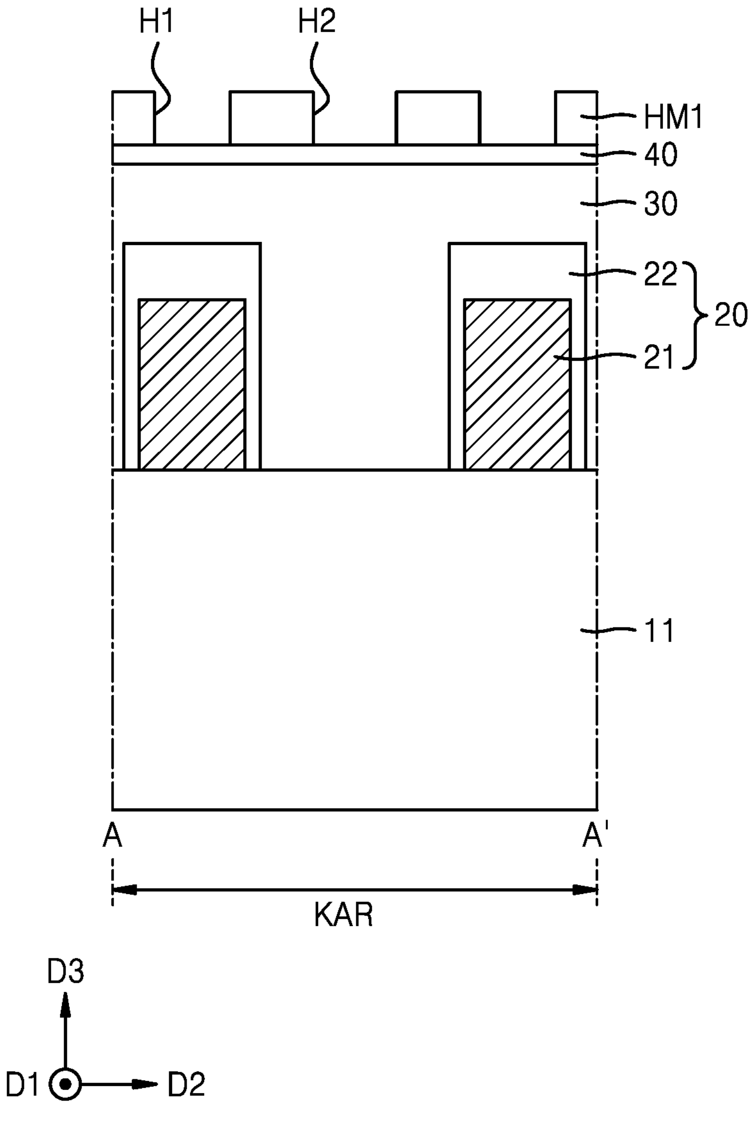

For example, as shown in FIG. 10B, a liner layer 40 may be formed on the interlayer insulating layer 30. Next, a first mask HM1 may be formed in the key region KAR using the contact alignment key patterns CKP (refer to FIGS. 5B and 6) of the contact layout CAL (operation S131). For example, the first mask HM1 may be a mask to which the contact alignment key patterns CKP of the contact layout CAL are transferred. In some embodiments of the present inventive concept, the liner layer 40 may include TiN, but the present inventive concept is not limited thereto. In some embodiments of the present inventive concept, the first mask HM1 may include a spin-on-hardmask (SOH) layer. In some embodiments of the present inventive concept, the first mask HM1 may further include a silicon oxide layer, a silicon nitride layer, and/or a silicon oxynitride layer.

In some embodiments of the present inventive concept, the first mask HM1 may include first holes H1, which overlap the gate alignment keys 20 in the third direction D3, and second holes H2, which do not overlap the gate alignment keys 20 in the third direction D3. In some embodiments of the present inventive concept, the first holes H1 and the second holes H2 may be alternately arranged and spaced apart from each other in the second direction D2. For example, the first holes H1 may correspond to the gate-contact overlay patterns CKP_OL (refer to FIGS. 5B and 6). For example, the first holes H1 may be formed by transferring the gate-contact overlay patterns CKP_OL. For example, the second holes H2 may correspond to the contact alignment key patterns CKP that do not overlap the gate alignment key patterns GKP (refer to FIGS. 5A and 6). For example, the second holes H2 may be formed by transferring the contact alignment key patterns CKP that do not overlap the gate alignment key patterns GKP. For example, the second holes H2 may correspond to the first portions CKP_1 (refer to FIG. 6) of the contact alignment key patterns CKP that do not overlap the second contact cut patterns CX2. For example, the second holes H2 may be obtained by transferring the first portions CKP_1 of the contact alignment key patterns CKP that do not overlap the second contact cut patterns CX2.

In some embodiments of the present inventive concept an operation of forming a contact mask in the chip region CA (refer to FIG. 1) may also be performed. For example, the contact mask may be fabricated by transferring the contact patterns CP (refer to FIGS. 5B and 6) of the contact layout CAL.

Figure 10C:
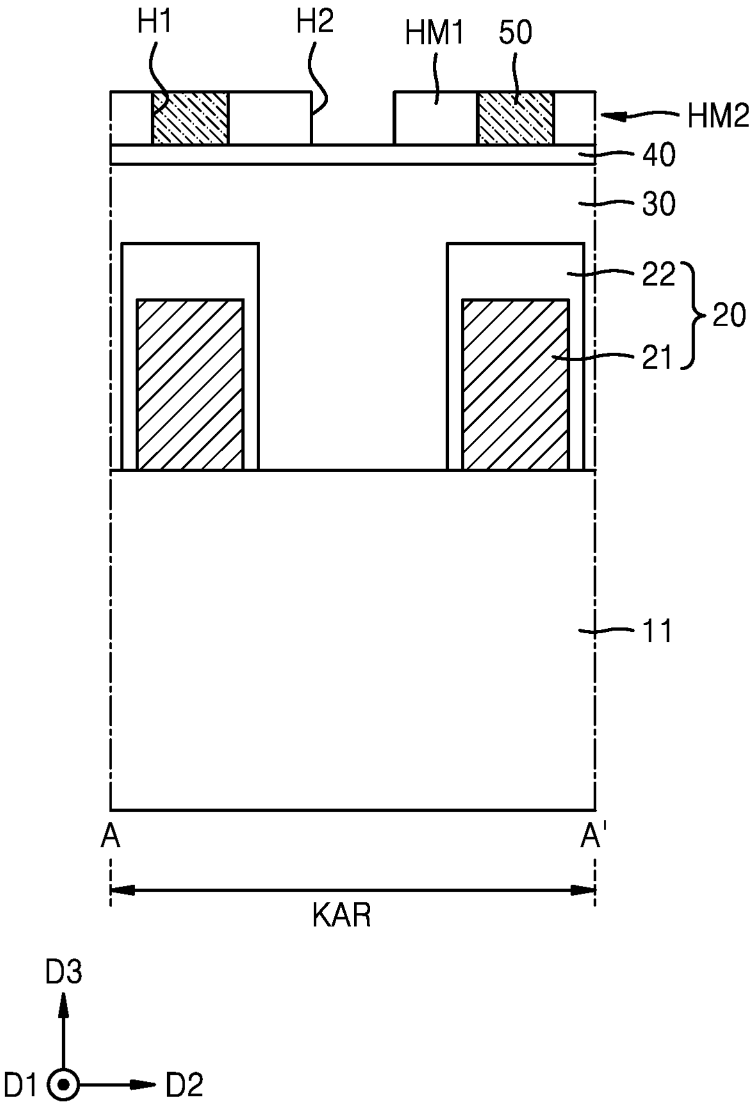

Next, as shown in FIG. 10C, a contact cut block 50 may be formed in the key region KAR using the contact cut layout CXL (refer to FIGS. 5C and 6). For example, portions of the contact cut block 50 may be formed in the first holes H1 of the first mask HM1. In other words, portions of the contact cut block 50 may overlap the gate alignment keys 20 in the third direction D3. For example, the contact cut block 50 may correspond to the second contact cut patterns CX2 (refer to FIGS. 5C and 6) of the contact cut layout CXL. For example, the contact cut block 50 may be obtained by transferring the second contact cut patterns CX2 of the contact cut layout CXL. For example, portions of the contact cut block 50 formed in the first holes H1 of the first mask HM1 may correspond to the gate-contact overlay cut patterns CX2_OL (refer to FIGS. 5C and 6). For example, portions of the contact cut block 50, which are formed in the first holes H1 of the first mask HM1, may be formed by transferring the gate-contact overlay cut patterns CX2_OL. In some embodiments of the present inventive concept, portions of the contact cut block 50 formed in the first holes H1 of the first mask HM1 may overlap the gate-contact overlay patterns CKP_OL (refer to FIGS. 5B and 6).

In some embodiments of the present inventive concept, other portions of the contact cut block 50 might not overlap the gate alignment keys 20 in the third direction D3. For example, other portions of the contact cut block 50 may overlap the second holes H2 in the first direction D1.

In some embodiments of the present inventive concept, portions of the contact cut block 50 may be disposed in the first holes H1 of the first mask HM1 to form a second mask HM2. For example, the second mask HM2 might not include the first holes H1 that overlap the gate alignment keys 20 in the third direction D3, but may include the second holes H2 that do not overlap the gate alignment keys 20 in the third direction D3.

In some embodiments of the present inventive concept, forming a contact cut block in the chip region CAR may also be performed. For example, the contact cut block may be formed by transferring the first contact cut patterns CX1 (refer to FIGS. 5C and 6) of the contact cut layout CXL. The contact cut block may fill portions of the contact mask formed by transferring the contact patterns CP.

Next, operation S133 of forming the contact alignment keys 60 using the second mask HM2 as an etch mask may be performed. For example, referring to FIG. 8, operation S133*a* of forming contact alignment key holes 60H by using the second mask HM2 may be performed.

Figure 10D:
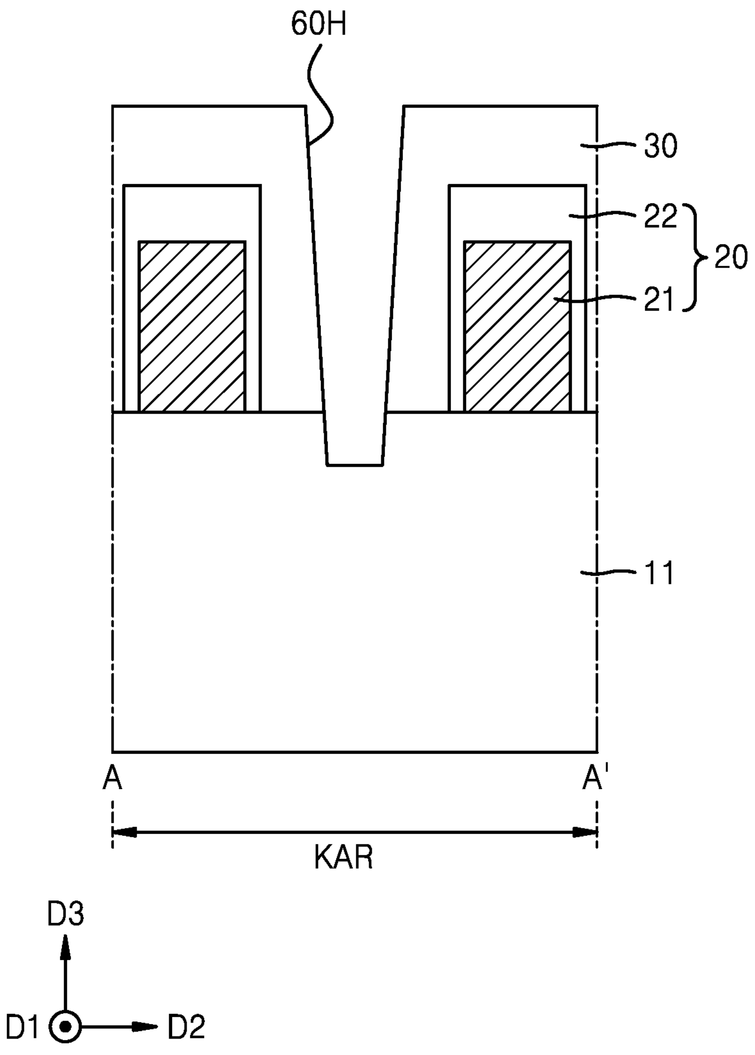

For example, as shown in FIG. 10D, the liner layer 40 exposed through the second holes H2 of the second mask HM2, the interlayer insulating layer 30, and the substrate 11 may be sequentially etched to form the contact alignment key holes 60H. For example, lower surfaces of the contact alignment key holes 60H may be at a vertical level lower than an upper surface of the substrate 11. Thereafter, the second mask HM2 and the liner layer 40 may be removed. For example, the contact alignment key holes 60H may correspond to portions of the contact alignment key patterns CKP other than portions of the contact alignment key patterns CKP that overlap the second contact cut patterns CX2. For example, the contact alignment key holes 60H may correspond to the first portions CKP_1 (refer to FIG. 6) of the contact alignment key patterns CKP that do not overlap the second contact cut patterns CX2. For example, the contact alignment key holes 60H may be formed by transferring the first portions CKP_1 of the contact alignment key patterns CKP that do not overlap the second contact cut patterns CX2.

In some embodiments of the present inventive concept an operation of forming contact holes in the chip region CAR may also be performed. For example, the contact holes may be formed using the contact mask formed by transferring the contact patterns CP and the contact cut block formed by transferring the first contact cut patterns CXL. For example, the contact holes may correspond to portions of the contact patterns CP other than portions of the contact patterns CP that do not overlap the first contact cut patterns CX1. For example, the contact holes may correspond to the first portions CP_1 (refer to FIG. 6) of the contact patterns CP that do not overlap the first contact cut patterns CX1. For example, the contact holes may be formed by transferring the first portions CP_1 of the contact patterns CP that do not overlap the first contact cut patterns CX1.

Next, referring to FIG. 8 again, operation S133*b* of forming conductive liners 61L on lateral and lower surfaces of the contact alignment key holes 60H, and operation S133*c* of forming conductive plugs 62 on the conductive liners 61L may be performed.

Figure 10E:
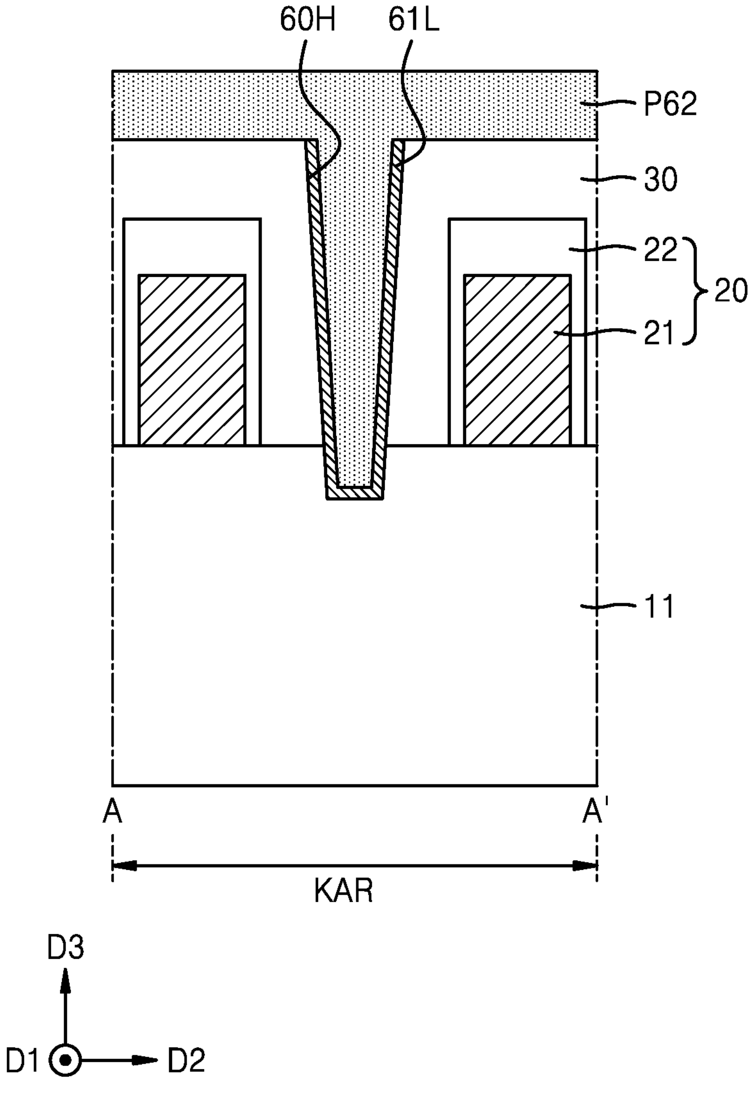

For example, as shown in FIG. 10E, after forming the conductive liners 61L that conformally cover the lateral and lower surfaces of the contact alignment key holes 60H, a pre-conductive plug P62 may be formed on the conductive liners 61L to fill the contact alignment key holes 60H. For example, the pre-conductive plug P62 may fully fill the contact alignment key holes 60H. An upper surface of the pre-conductive plug P62 may be at a vertical level higher than an upper surface of the interlayer insulating layer 30.

In some embodiments of the present inventive concept, the conductive liners 61L may include titanium (Ti), tantalum (Ta), tungsten (W), TiN, TaN, WN, WCN, TiSiN, TaSiN, WSiN, or a combination thereof, but the present inventive concept is not limited thereto. In some embodiments of the present inventive concept, the pre-conductive plug P62 may include molybdenum (Mo), copper (Cu), tungsten (W), cobalt (Co), ruthenium (Ru), manganese (Mn), titanium (Ti), tantalum (Ta), aluminum (Al), a combination thereof, or an alloy thereof, but the present inventive concept is not limited thereto.

Figure 10F:
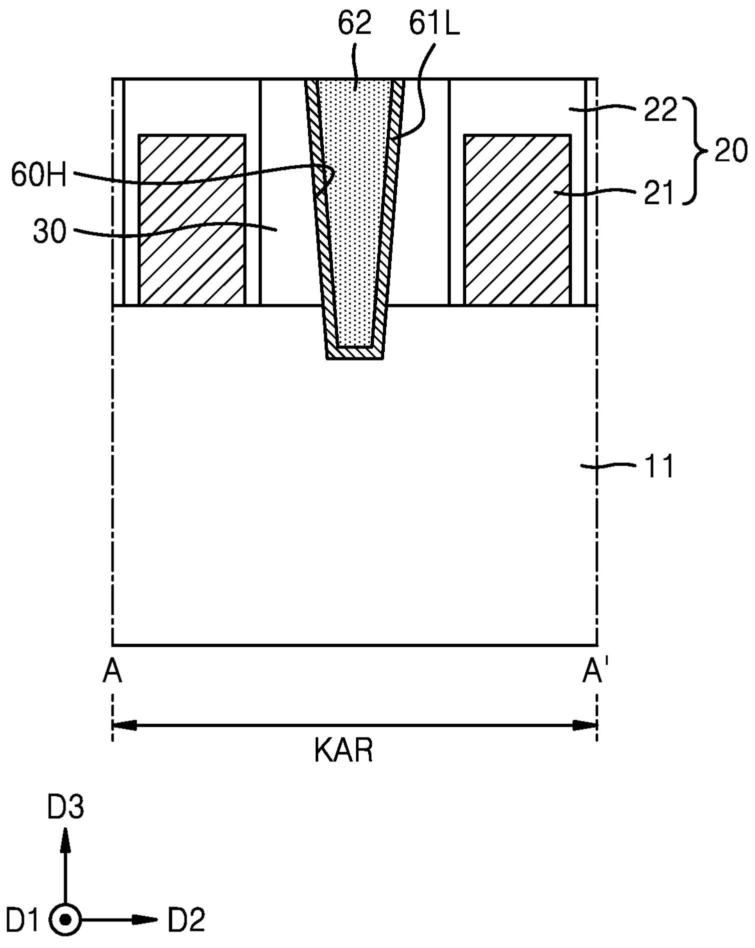

Next, as shown in FIG. 10F, the conductive plugs 62 may be formed by removing an upper portion of the pre-conductive plug P62, upper portions of the conductive liners 61L, and an upper portion of the interlayer insulating layer 30. The upper portion of the pre-conductive plug P62, the upper portions of the conductive liners 61L, and the upper portion of the interlayer insulating layer 30 may be removed by using a chemical-mechanical polishing (CMP) process. After the removal process, upper surfaces of the conductive plugs 62 and the upper surface of the interlayer insulating layer 30 may be at substantially the same vertical level. For example, upper surfaces of the conductive plugs 62, the upper surface of the interlayer insulating layer 30, and the upper surface of the insulating pattern 22 may be at substantially the same vertical level.

In some embodiments of the present inventive concept, an operation of forming conductive barrier patterns and contact plugs in the chip region CAR may also be performed. The conductive barrier patterns may include the same material as the material of the conductive liners 61L. The contact plugs may include the same material as the material of the conductive plugs 62.

Figure 10G:
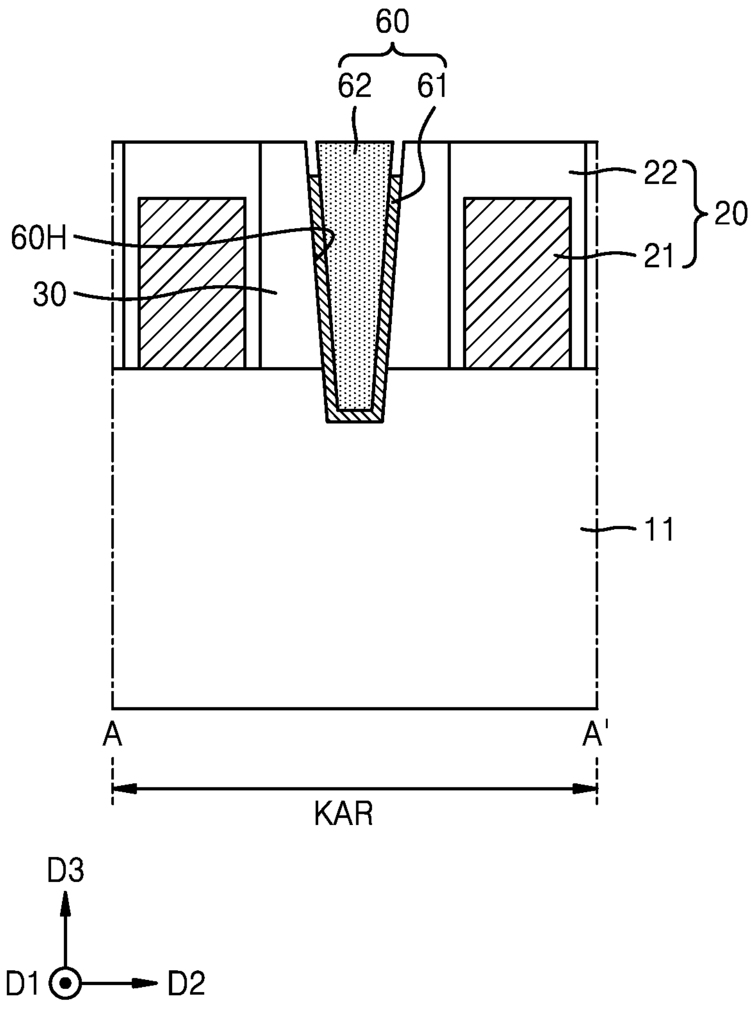

Next, referring back to FIG. 8, operation S133*d* of removing upper portions of the conductive liners 61L may be performed. For example, as shown in FIG. 10G, portions of the conductive liners 61L that are on upper portions of the lateral surfaces of the contact alignment key holes 60H may be removed to form conductive liners 61. Then, the uppermost surfaces of the conductive liners 61 may be at a vertical level lower than the upper surfaces of the conductive plugs 62 and the upper surface of the interlayer insulating layer 30. As a result, the contact alignment keys 60 including the conductive liners 61 and the conductive plugs 62 may be formed. The contact alignment keys 60 might not overlap the gate alignment keys 20 in the third direction D3.

The integrated circuit device 10 including the gate alignment keys 20 and the contact alignment keys 60 that do not overlap each other in the third direction D3 may be manufactured by the integrated circuit device manufacturing method S100 described with reference to FIGS. 10A to 10G. For example, the integrated circuit device 10 might not include contact alignment keys that overlap the gate alignment keys 20 in the third direction D3.

The present inventive concept may provide a layout fabricating method including operation S11 of designing the layout L1 including the gate-contact overlay cut patterns CX2_OL for cutting the gate-contact overlay patterns CKP_OL that overlap the gate alignment key patterns GKP. Because the layout L1 including the gate-contact overlay cut patterns CX2_OL for cutting the gate-contact overlay patterns CKP_OL is designed in operation S11, the integrated circuit device manufacturing method S100 using the layout fabricating method might not include an additional operation for removing contact alignment keys that overlap the gate alignment keys 20.

Unlike the present inventive concept, when contact alignment keys overlapping the gate alignment keys 20 in the third direction D3 are formed by the gate-contact overlay patterns CKP_OL that overlap the gate alignment key patterns GKP, the contact alignment keys may be unnecessary elements. Unlike the present inventive concept, when contact alignment keys overlapping the gate alignment keys 20 in the third direction D3 are formed, defects may be caused due to unnecessary elements.

Therefore, embodiments of the present inventive concept may provide a layout fabricating method capable of removing unnecessary gate-contact overlay patterns CKP_OL. Therefore, embodiments of the present inventive concept may provide an integrated circuit device manufacturing method by which integrated circuit devices having increased performance and reliability may be manufactured. Hereinafter, the present inventive concept will be described in comparison with a comparative example.

Figure 11:
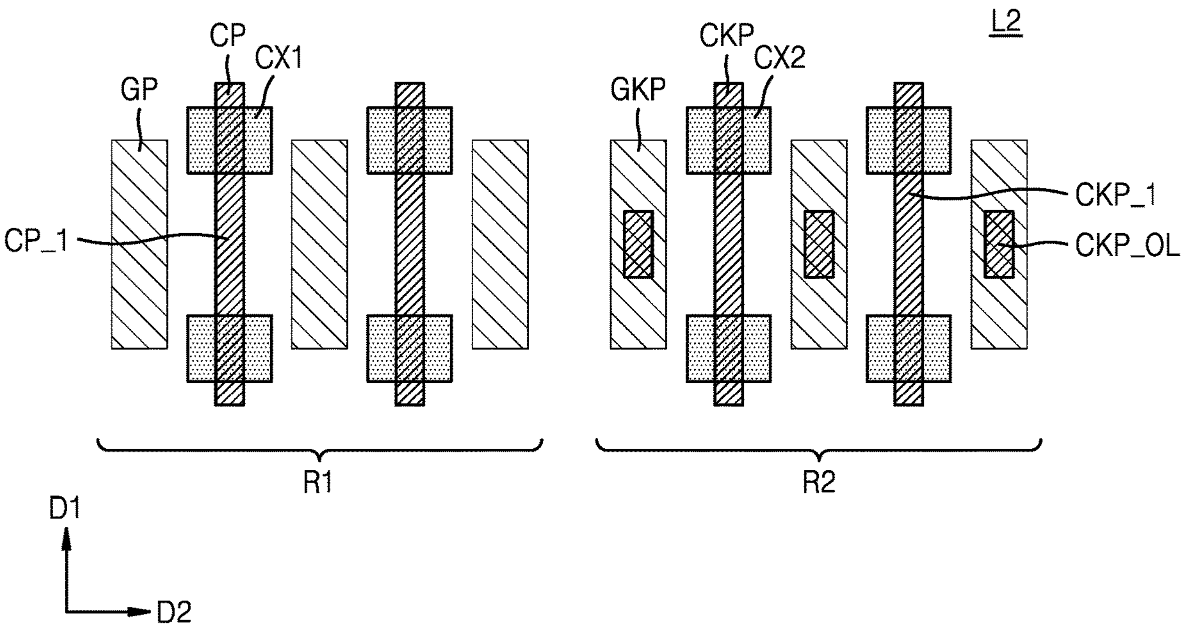
FIG. 11 is a diagram illustrating a layout designed by a layout design method according to a comparative example.

FIG. 11 is a diagram illustrating a layout L2 designed by a layout design method according to a comparative example. FIGS. 12A to 12D are cross-sectional views illustrating an integrated circuit device manufacturing method according to a comparative example for comparison with the integrated circuit device manufacturing method S100 (refer to FIG. 7) of the embodiments. For example, FIGS. 12A to 12D are cross-sectional views illustrating a manufacturing method according to a comparative example for operations subsequent to the operations described with reference to FIGS.

10A and 10B. That is, FIGS. 12A to 12D illustrate an integrated circuit device manufacturing method using the layout L2 shown in FIG. 11.

Referring to FIG. 11, the layout L2 designed by the layout design method of the comparative example might not include the gate-contact overlay cut patterns CX2_OL (refer to FIG. 6) compared with the layout L1 (refer to FIG. 6) designed by the layout design method according to the embodiments of the present inventive concept.

For example, the layout L2 may include gate-contact overlay patterns CKP_OL but might not include gate-contact overlay cut patterns CX2_OL that are for cutting the gate-contact overlay patterns CKP_OL. For example, according to the layout design method of the comparative example, contact alignment key patterns CKP overlapping gate alignment key patterns GKP, that is, gate-contact overlay patterns CKP_OL may be formed to overlap the gate alignment key patterns GKP, but contact cut patterns overlapping the gate-contact overlay patterns CKP_OL, that is, gate-contact overlay cut patterns CX2_OL might not be formed to overlap the gate-contact overlay patterns CKP_OL.

Next, the integrated circuit device manufacturing method of the comparative example using the layout L2 will be described with reference to FIGS. 12A to 12D. Hereinafter, differences from those described with reference to FIGS. 10C to 10G will be mainly described.

Figure 12A:
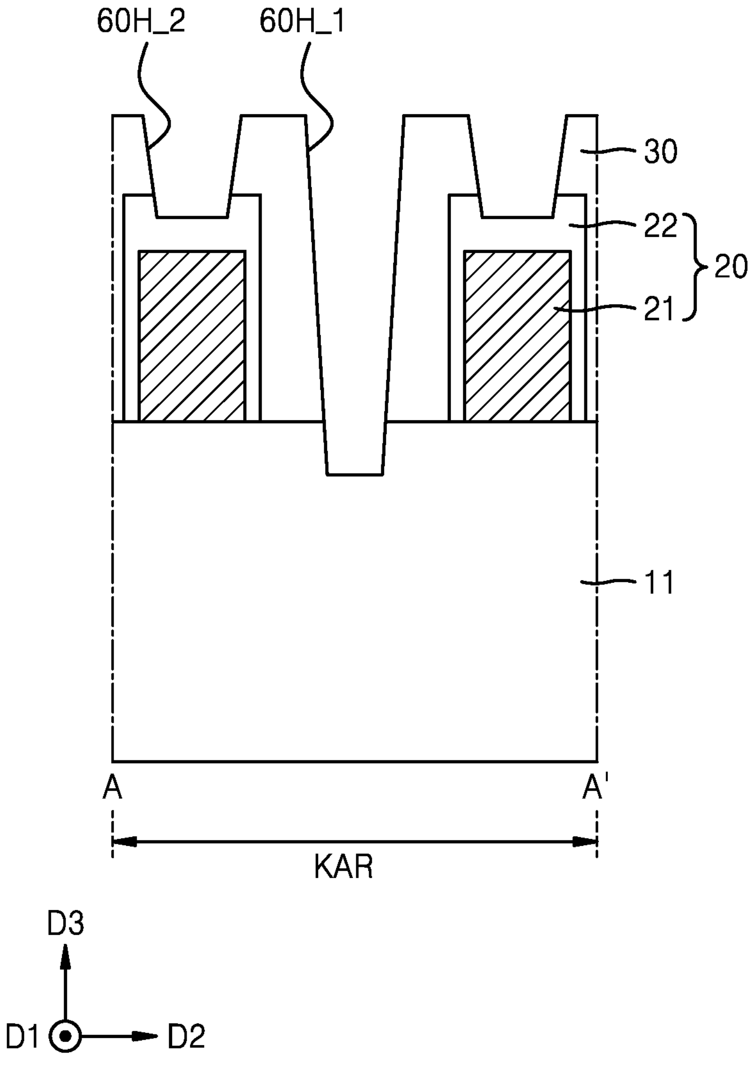
FIGS. 12A, 12B, 12C and 12D are cross-sectional views illustrating an integrated circuit device manufacturing method according to a comparative example for comparison with an integrated circuit device manufacturing method according to some embodiments of the present inventive concept.

Referring to FIG. 12A, first comparison contact alignment key holes 60H_1 and second comparison contact alignment key holes 60H_2 may be formed in a key region KAR using the first mask HM1 described with reference to FIG. 10B as an etch mask. For example, the liner layer 40 exposed through the second holes H2, the interlayer insulating layer 30, and the substrate 11 may be sequentially etched to form the first comparison contact alignment key holes 60H_1. For example, the liner layer 40 exposed through the first holes H1, the interlayer insulating layer 30, and the insulating patterns 22 may be etched to form the second comparison contact alignment key hole 60H_2. For example, the first comparison contact alignment key holes 60H_1 that do not overlap the gate alignment keys 20 in the third direction D3 and the second comparison contact alignment key holes 60H_2 that overlap the gate alignment keys 20 in the third direction D3 may be formed. In other words, unlike the integrated circuit device manufacturing method S100 of the embodiments, according to the layout design method of the comparative example and the integrated circuit device manufacturing method using the layout design method, the gate-contact overlay cut patterns CX2_OL (refer to FIGS. 5C and 6) are not formed, and thus, the second comparison contact alignment key holes 60H_2 overlapping the gate alignment keys 20 in the third direction D3 may be formed.

In some embodiments of the present inventive concept, the depths of the first comparison contact alignment key holes 60H_1 in the third direction D3 may be greater than the depths of the second comparison contact alignment key holes 60H_2 in the third direction D3. In some embodiments of the present inventive concept, lower surfaces of the second comparison contact alignment key holes 60H_2 may be at a vertical level that is lower than upper surfaces of the gate alignment keys 20.

Figure 12B:
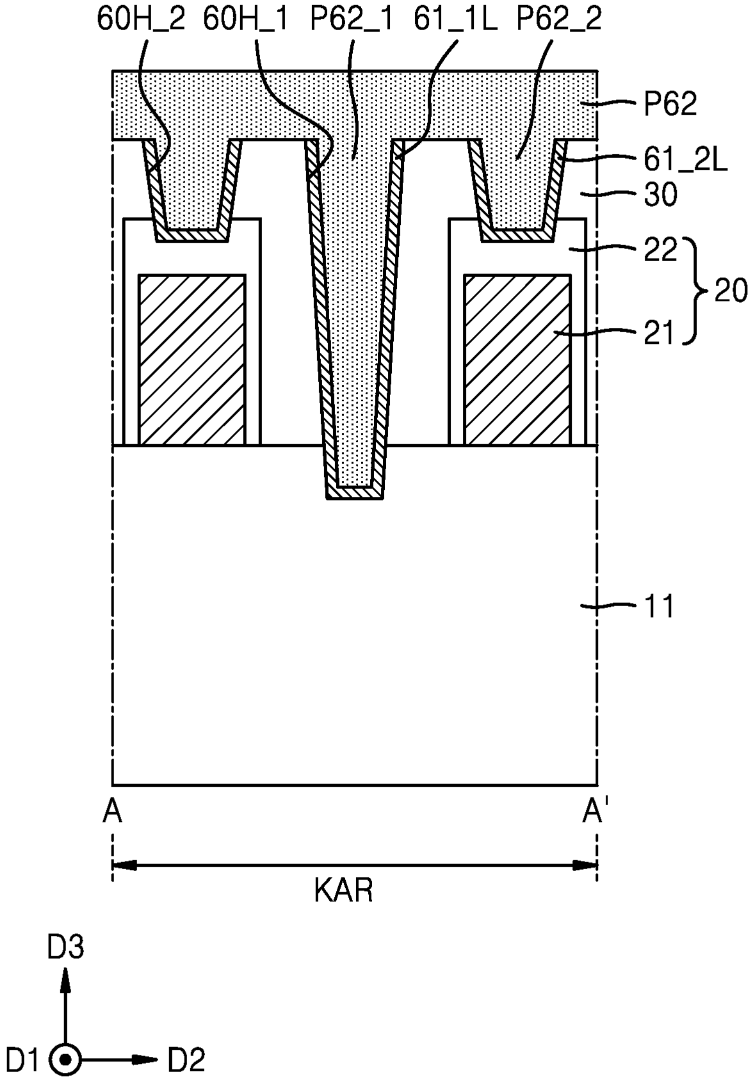

Next, referring to FIG. 12B, first and second comparison conductive liners 61_1L and 61_2L may be formed to conformally cover lateral and lower surfaces of the first and second comparison contact alignment key holes 60H_1 and 60H_2, respectively. For example, the first comparison conductive liners 61_1L may be formed in the first comparison contact alignment key holes 60H_1. For example, the second comparison conductive liners 61_2L may be formed in the second comparison contact alignment key holes 60H_2. For example, the second comparison conductive liners 61_2L covering the lower surfaces of the second comparison contact alignment key holes 60H_2 may be at a vertical level that is lower than the upper surfaces of the gate alignment keys 20. For example, upper surfaces of the second comparison conductive liners 61_2L that are on the lower surfaces of the second comparison contact alignment key hole 60H_2 may be located at a vertical level lower than the upper surfaces of the gate alignment keys 20.

Next, a comparison pre-conductive plug P62 may be formed on the first and second comparison conductive liners 61_1L and 61_2L to completely fill the first and second comparison contact alignment key holes 60H_1 and 60H_2. For example, the comparison pre-conductive plug P62 may include the following: first comparison pre-conductive plug portions P62_1 disposed in the first comparison contact alignment key holes 60H_1; and second comparison pre-conductive plug portions P62_2 disposed in the second comparison contact alignment key holes 60H_2. An upper surface of the comparison pre-conductive plug P62 may be at a vertical level higher than the upper surface of the interlayer insulating layer 30.

Figure 12C:
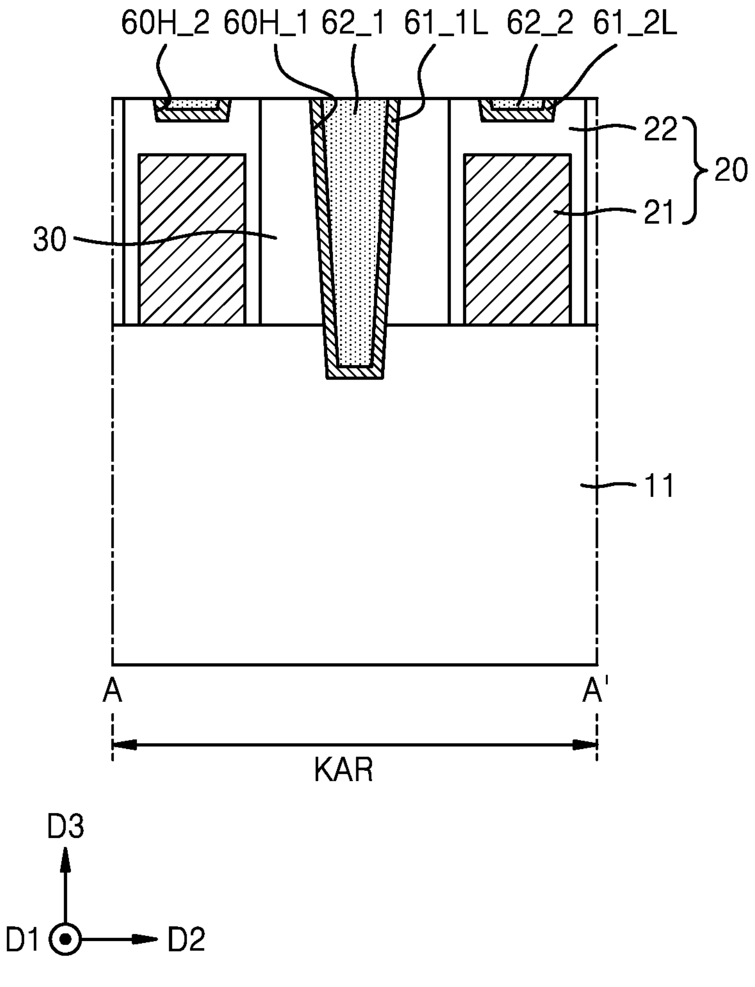

Next, referring to FIG. 12C, an upper portion of the comparison pre-conductive plug P62, upper portions of the first and second comparison conductive liners 61_1L and 61_2L, and an upper portion of the interlayer insulating layer 30 may be removed. The upper portion of the comparison pre-conductive plug P62, the upper portions of the first and second comparison conductive liners 61_1L and 61_2L, and the upper portion of the interlayer insulating layer 30 may be removed through a CMP process. Through the CMP process, the first comparison conductive plug portions 62_1 may be formed in the first comparison contact alignment key holes 60H_1. Through the CMP process, the second comparison conductive plug portions 62_2 may be formed in the second comparison contact alignment key holes 60H_2. That is, even after the CMP process, the second comparison conductive plug portions 62_2 overlapping the gate alignment keys 20 in the third direction D3 may remain. After the CMP process (removal process), upper surfaces of the first and second comparison conductive plug portions 62_1 and 62_2 and the upper surface of the interlayer insulating layer 30 may be at the same vertical level as each other.

Figure 12D:
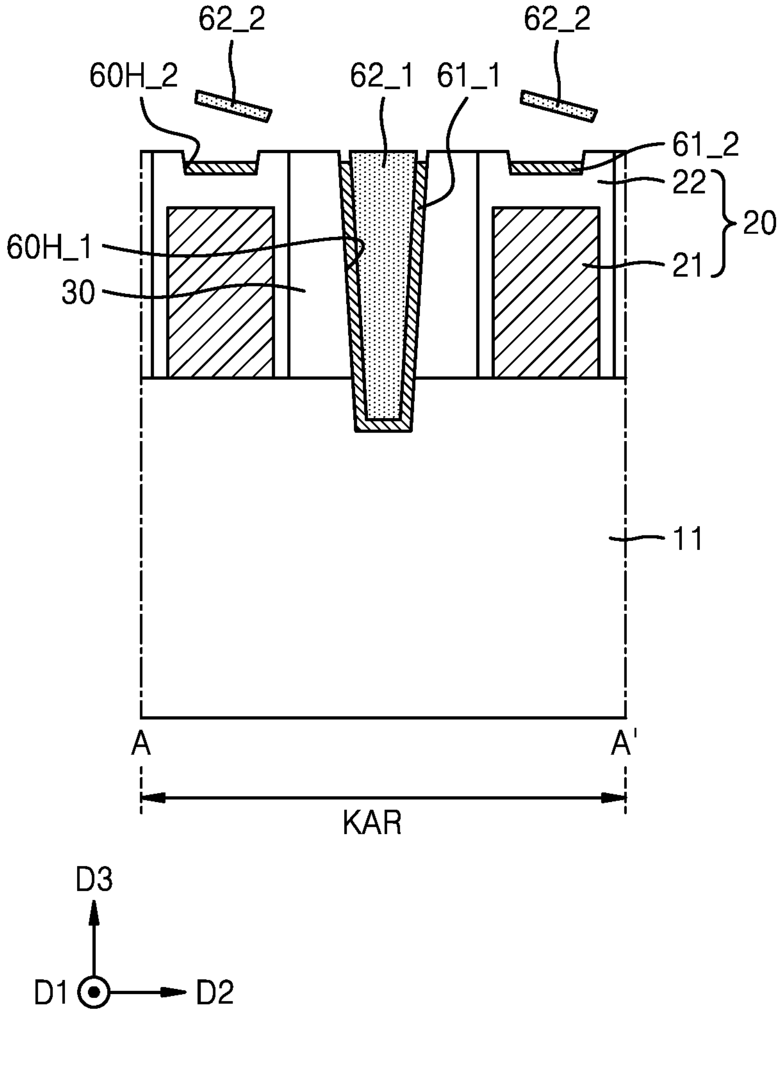

Next, referring to FIG. 12D, portions of the first and second comparison conductive liners 61_1L and 61_2L may be removed to form first and second comparison conductive liners 61_1 and 61_2. For example, portions of the first comparison conductive liners 61_1L disposed on upper portions of lateral surfaces of the first comparison contact alignment key holes 60H_1 may be removed. For example, portions of the second comparison conductive liners 61_2L disposed on lateral surfaces of the second comparison contact alignment key holes 60H_2 may be removed. In this case, the depths of the second comparison contact alignment key holes 60H_2 are less than the depths of the first comparison contact alignment key holes 60H_1, and the lengths of the second comparison conductive liners 61_2L disposed on the lateral surfaces of the second comparison contact alignment key holes 60H_2 are less than the lengths of the first comparison conductive liners 61_1L disposed on lateral surfaces of the first comparison contact alignment key holes 60H_1. Thus, while portions of the first comparison conductive liners 61_1L disposed on the lateral surfaces of the first comparison contact alignment key hole 60H_1 are removed, the second comparison conductive liners 61_2L disposed on the lateral surfaces of the second comparison contact alignment key holes 60H_2 may be entirely removed.

In the comparative example, the second comparison conductive liners 61_2L disposed between the second comparison conductive plug portions 62_2 and the insulating patterns 22 may be removed, and thus, the second comparison conductive plug portions 62_2 might not be disposed within the second comparison contact alignment key holes 60H_2. For example, in an integrated circuit device manufactured by the integrated circuit device manufacturing method according to the comparative example, the second comparison conductive plug portions 62_2 may be lifted. That is, the integrated circuit device according to the comparative example may be defective due to lifting of the second comparison conductive plug portions 62_2.

In the comparative example, unlike illustrated in FIG. 12D, the second comparison conductive liners 61_2L disposed in the second comparison contact alignment key holes 60H_2 may be entirely removed, and the second comparison conductive plug portions 62_2 might not be disposed within the second comparison contact alignment key holes 60H_2. In this case, lifting of the second comparison conductive plug portions 62_2 may also occur in the integrated circuit device of comparative example.

However, according to the integrated circuit device manufacturing method S100 of the embodiments described with reference to FIGS. 7 to 10G, contact alignment keys overlapping the gate alignment keys 20 are not formed, and thus, a situation in which contact alignment keys overlapping the gate alignment keys 20 are lifted in a subsequent process may be prevented. In addition, according to the integrated circuit device manufacturing method S100 of the embodiments of the present inventive concept, errors might not occur due to lifting of contact alignment keys overlapping the gate alignment keys 20.

Figure 13:
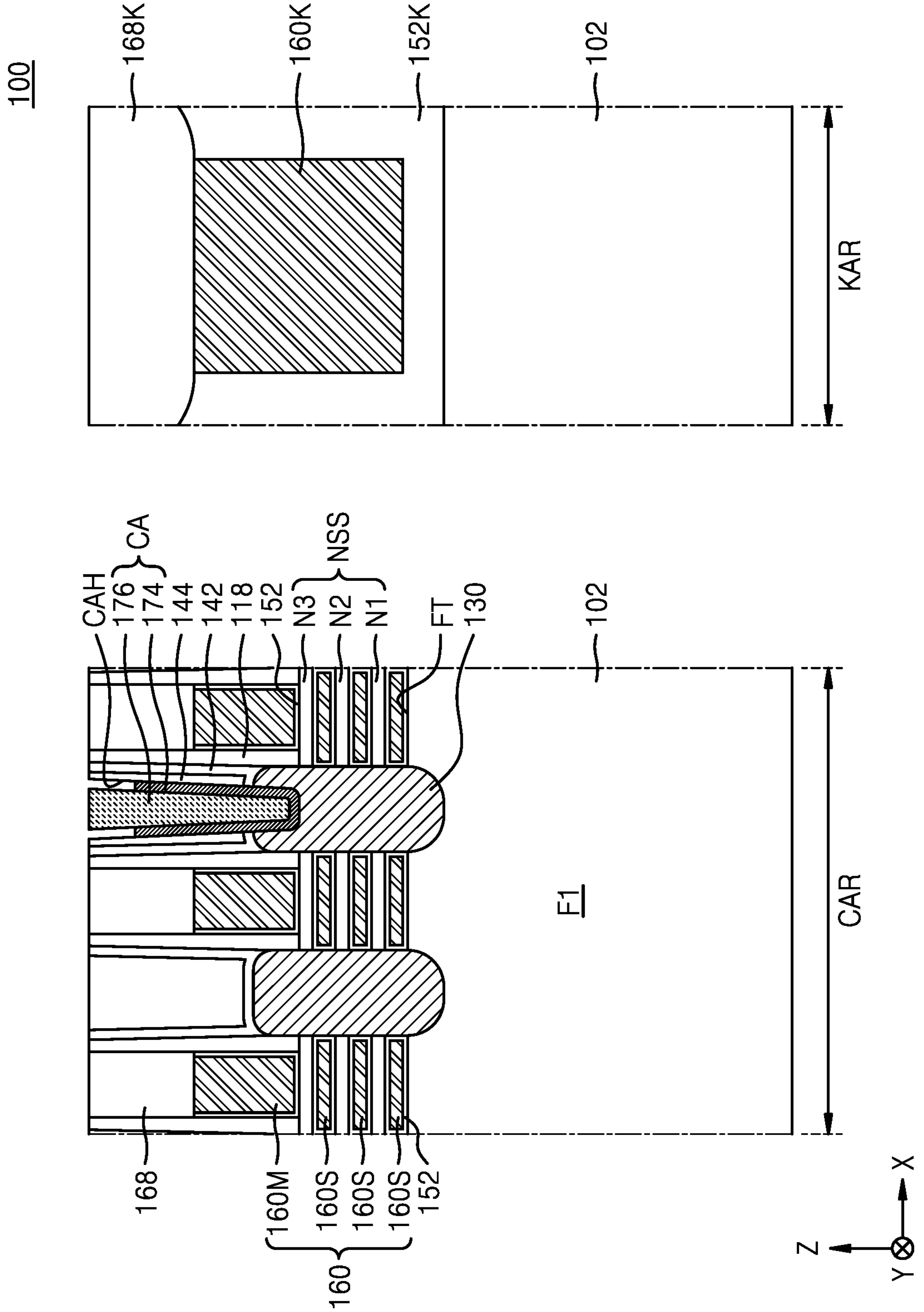
FIG. 13 is a cross-sectional view illustrating an integrated circuit device manufacturing method according to some embodiments of the present inventive concept.

FIG. 13 is a cross-sectional view illustrating an integrated circuit device manufacturing method according to some embodiments of the present inventive concept. FIGS. 14A to 14D are cross-sectional views illustrating an integrated circuit device manufacturing method according to a comparative example for comparison with the integrated circuit device manufacturing method of the embodiments of the present inventive concept.

Referring to FIG. 13, an integrated circuit device 100 may include: active regions provided in the form of nanowires or nanosheets; and field effect transistors having a gate-all-around structure including gates surrounding the active region. The integrated circuit device 100 may form a logic cell.

In some embodiments of the present inventive concept, the integrated circuit device 100 may include a substrate 102 and fin-type active regions F1 protruding from a chip region CAR of the substrate 102. The fin-type active regions F1 may extend parallel to each other on the substrate 102 in a first horizontal direction (e.g., the X direction). The fin-type active regions F1 may be defined by an isolation layer.

In some embodiments of the present inventive concept, a plurality of gate lines 160 may be disposed on the fin-type active regions F1. Each of the gate lines 160 may extend in a second horizontal direction (e.g., the Y direction) crossing the first horizontal direction (e.g., the X direction). In regions in which the fin-type active regions F1 and the gate lines 160 cross each other, a plurality of nanosheet stacks NSS may be disposed respectively above fin top surfaces FT of the fin-type active regions F1. Each of the nanosheet stacks NSS may include at least one nanosheet facing the fin top surface FT of the fin-type active region F1 at a position spaced apart from the fin top surface FT of the fin-type active region F1 in a vertical direction (e.g., the Z direction). In the present disclosure, the term "nanosheet" refers to a conductive structure having a cross-section substantially perpendicular to a direction in which current flows. The term "nanosheet" encompasses a nanowire.

In some embodiments of the present inventive concept, each of the nanosheet stacks NSS may include a first nanosheet N1, a second nanosheet N2, and a third nanosheet N3 that overlap each other in the vertical direction (e.g., the Z direction) above the fin-type active region F1. The first nanosheet N1, the second nanosheet N2, and the third nanosheet N3 may have different vertical distances (e.g., the Z-direction distances) from the fin top surface FT of the fin-type active region F1. Each of the gate lines 160 may at least partially surround the first nanosheet N1, the second nanosheet N2, and the third nanosheet of a nanosheet stack NSS that overlap each other in the vertical direction (e.g., the Z direction).

In some embodiments of the present inventive concept, each of the first nanosheets N1, the second nanosheets N2, and the third nanosheets N3 of the nanosheet stacks NSS may function as a channel region. In some embodiments of the present inventive concept, each of the first nanosheets N1, the second nanosheets N2, and the third nanosheets N3 may have a thickness selected from a range of about 4 nm to about 6 nm, but the present inventive concept is not limited thereto. Here, the thickness of each of the first nanosheets N1, the second nanosheets N2, and the third nanosheets N3 refers to a size in the vertical direction (e.g., the Z direction). In some embodiments of the present inventive concept, the first nanosheets N1, the second nanosheets N2, and the third nanosheets N3 may have substantially the same thickness in the vertical direction (e.g., the Z direction). In some embodiments of the present inventive concept, at least some of the first nanosheets N1, the second nanosheets N2, and the third nanosheets N3 may have different thicknesses in the vertical direction (e.g., the Z direction). In some embodiments of the present inventive concept, each of the first nanosheets N1, the second nanosheets N2, and the third nanosheets N3 of the nanosheet stacks NSS may include a Si layer, a SiGe layer, or a combination thereof.

In some embodiments of the present inventive concept, the first nanosheet N1, the second nanosheet N2, and the third nanosheet N3 included in one nanosheet stack NSS may have the same or similar size in the first horizontal direction (e.g., the X direction) as each other. In some embodiments of the present inventive concept, unlike illustrated in FIG. 13, the first nanosheet N1, the second nanosheet N2, and the third nanosheet N3 included in one nanosheet stack NSS may have different sizes in the first horizontal direction (e.g., the X direction) from each other. In the example shown in FIG. 13, each of the nanosheet stacks NSS includes three nanosheets. However, embodiments of the present inventive concept are not limited thereto. For example, each of the nanosheet stacks NSS may include at least one nanosheet, and the number of nanosheets included in each of the nanosheet stacks NSS is not limited.

In some embodiments of the present inventive concept, each of the gate lines 160 may include a main gate portion 160M and a plurality of sub-gate portions 160S. The main gate portion 160M may cover an upper surface of a nanosheet stack NSS and may extend in the second horizontal direction (e.g., the Y direction). For example, the main gate portion 160M may be disposed on the nanosheet stack NSS. The sub-gate portions 160S may be integrally connected to the main gate portion 160M, and may each be disposed between the first nanosheet N1, the second nanosheet N2, and the third nanosheet N3 and between the first nanosheet N1 and the fin-type active region F1. In the vertical direction (e.g., the Z direction), the thickness of each of the sub-gate portions 160S may be less than the thickness of the main gate portion 160M. In some embodiments of the present inventive concept, each of the gate lines 160 may include a metal, a metal nitride, a metal carbide, or a combination thereof. The metal may include at least one of, for example, Ti, W, Ru, Nb, Mo, Hf, Ni, Co, Pt, Yb, Tb, Dy, Er, and/or Pd. The metal nitride may include at least one of, for example, TiN and/or TaN. The metal carbide may be, for example, TiAlC. However, the material of the gate lines 160 is not limited to those listed above.

In some embodiments of the present inventive concept, a plurality of recesses may be formed in the fin-type active regions F1. The vertical level of the lowest surface of each of the recesses may be lower than the vertical level of the fin top surfaces FT of the fin-type active regions F1.

In some embodiments of the present inventive concept, a plurality of source/drain regions 130 may be disposed in the recesses. Each of the source/drain regions 130 may be disposed adjacent to at least one gate line 160 of the gate lines 160. Each of the source/drain regions 130 may have surfaces facing the first nanosheets N1, the second nanosheets N2, and the third nanosheets N3 of nanosheet stacks NSS that are adjacent to the source/drain region 130. Each of the source/drain regions 130 may be in contact with the first nanosheets N1, the second nanosheets N2, and the third nanosheets N3 of the nanosheet stacks NSS that is adjacent to the source/drain region 130.

In some embodiments of the present inventive concept, gate dielectric layers 152 may be provided between the nanosheet stacks NSS and the gate lines 160. In some embodiments of the present inventive concept, the gate dielectric layers 152 may each have a structure in which an interface dielectric layer and a high-k dielectric layer are stacked on each other. The interface dielectric layer may include a low-k dielectric material layer having a dielectric constant of about 9 or less, for example, a silicon oxide layer, a silicon oxynitride layer, or a combination thereof. In some embodiments of the present inventive concept, the interface dielectric layer may be omitted. The high-k dielectric layer may include a material having a dielectric constant that is greater than the dielectric constant of the silicon oxide layer. For example, the high-k dielectric layer may have a dielectric constant of about 10 to about 25. The high-k dielectric layer may include, for example, hafnium oxide, but is not limited thereto.

In some embodiments of the present inventive concept, upper surfaces of the gate dielectric layers 152 and the gate lines 160 may be covered with capping insulating patterns 168. The capping insulating patterns 168 may each include, for example, a silicon nitride layer.

In some embodiments of the present inventive concept, both sidewalls of the gate lines 160 and the capping insulating patterns 168 may be covered with outer insulating spacers 118. The outer insulating spacers 118 may cover both sidewalls of the main gate portions 160M on upper surfaces of the nanosheet stacks NSS. The outer insulating spacers 118 may be space apart from the gate lines 160 with the gate dielectric layers 152 disposed therebetween.

In some embodiments of the present inventive concept, insulating liners 142 and inter-gate insulating layers 144 may be sequentially disposed above the source/drain regions 130. The insulating liners 142 and the inter-gate insulating layers 144 may form insulating structures. In some embodiments of the present inventive concept, the insulating liners 142 may include silicon nitride, SiCN, SiBN, SiON, SiOCN, SiBCN, or a combination thereof, but are not limited thereto. The inter-gate insulating layers 144 may each include, for example, a silicon oxide layer, but are not limited thereto.

In some embodiments of the present inventive concept, both sidewalls of the sub-gate portions 160S included in the gate lines 160 may be spaced apart from the source/drain regions 130 with the gate dielectric layers 152 disposed therebetween. The gate dielectric layers 152 may be formed between the sub-gate portions 160S of the gate lines 160 and the first nanosheets N1, the second nanosheets N2, and the third nanosheets N3, and between the sub-gate portions 160S of the gate lines 160 and the source/drain regions 130.

The nanosheet stacks NSS may be arranged on the fin top surfaces FT of the fin-type active regions F1 in areas in which the fin-type active regions F1 and the gate lines 160 cross each other, and may face the fin top surfaces FT of the fin-type active region F1 at positions that are spaced apart from the fin-type active regions F1. A plurality of nanosheet transistors may be formed on the substrate 102 at portions at which the fin-type active regions F1 and the gate lines 160 cross each other.

In some embodiments of the present inventive concept, a metal silicide layer may be formed on an upper surface of each of the source/drain regions 130. The metal silicide layer may include a metal including, for example, Ti, W, Ru, Nb, Mo, Hf, Ni, Co, Pt, Yb, Tb, Dy, Er, or Pd. For example, the metal silicide layer may include titanium silicide, but is not limited thereto.

In some embodiments of the present inventive concept, a plurality of source/drain contacts CA may be arranged on the source/drain regions 130. The source/drain contacts CA may respectively pass through the inter-gate insulating layers 144 and the insulating liners 142 in the vertical direction (e.g., the Z direction) for contact with the metal silicide layers. The source/drain contacts CA may be electrically connected to the source/drain regions 130, respectively, through the metal silicide layers. The source/drain contacts CA may be spaced apart from the main gate portions 160M in the first horizontal direction (e.g., the X direction) with the outer insulating spacers 118 disposed therebetween.

The source/drain contacts CA may include conductive barrier patterns 174 and contact plugs 176 sequentially stacked on the source/drain regions 130. The conductive barrier patterns 174 may at least partially surround lower surfaces and sidewalls of the contact plugs 176 and may be in contact with the lower surfaces and the sidewalls of the contact plugs 176. The source/drain contacts CA may extend in the vertical direction (e.g., the Z direction) respectively through the inter-gate insulating layers 144 and the insulating liners 142. For example, the source/drain contacts CA may be arranged in source/drain contact holes CAH formed by partially etching the inter-gate insulating layers 144, the insulating liners 142, and the source/drain regions 130. The conductive barrier patterns 174 may be arranged between the source/drain regions 130 and the contact plugs 176. The conductive barrier patterns 174 may have surfaces that are in contact with the metal silicide layers, and surfaces that are in contact with the contact plugs 176. In some embodiments of the present inventive concept, the conductive barrier patterns 174 may include a metal or a metal nitride. For example, the conductive barrier patterns 174 may include titanium (Ti), tantalum (Ta), tungsten (W), TiN, TaN, WN, WCN, TiSiN, TaSiN, WSiN, or a combination thereof, but are not limited thereto. The contact plugs 176 may include, for example, molybdenum (Mo), copper (Cu), tungsten (W), cobalt (Co), ruthenium (Ru), manganese (Mn), titanium (Ti), tantalum (Ta), aluminum (Al), a combination thereof, or an alloy thereof, but are not limited thereto.

According to the integrated circuit device manufacturing method of the embodiments of the present inventive concept, upper portions of the conductive barrier patterns 174 may be removed to form the source/drain contacts CA. As a result, upper surfaces of the conductive barrier patterns 174 may be at a vertical level that is lower than that of upper surfaces of the contact plugs 176.

In some embodiments of the present inventive concept, the integrated circuit device 100 may include gate alignment keys 160K in a key region KAR of the substrate 102, first insulating patterns 152K at least partially surrounding the gate alignment keys 160K, and second insulating patterns 168K on the gate alignment keys 160K and the first insulating patterns 152K. The key region KAR of the integrated circuit device 100 might not include contact alignment keys that overlap the gate alignment keys 160K.

In the integrated circuit device manufacturing method of the embodiments of the present inventive concept, the second insulating patterns 168K might not be etched. Hereinafter, an integrated circuit device 100_1 manufactured according to a comparative example will be described with reference to FIGS. 14A to 14D for comparison with embodiments of the present inventive concept.

Figure 14A:
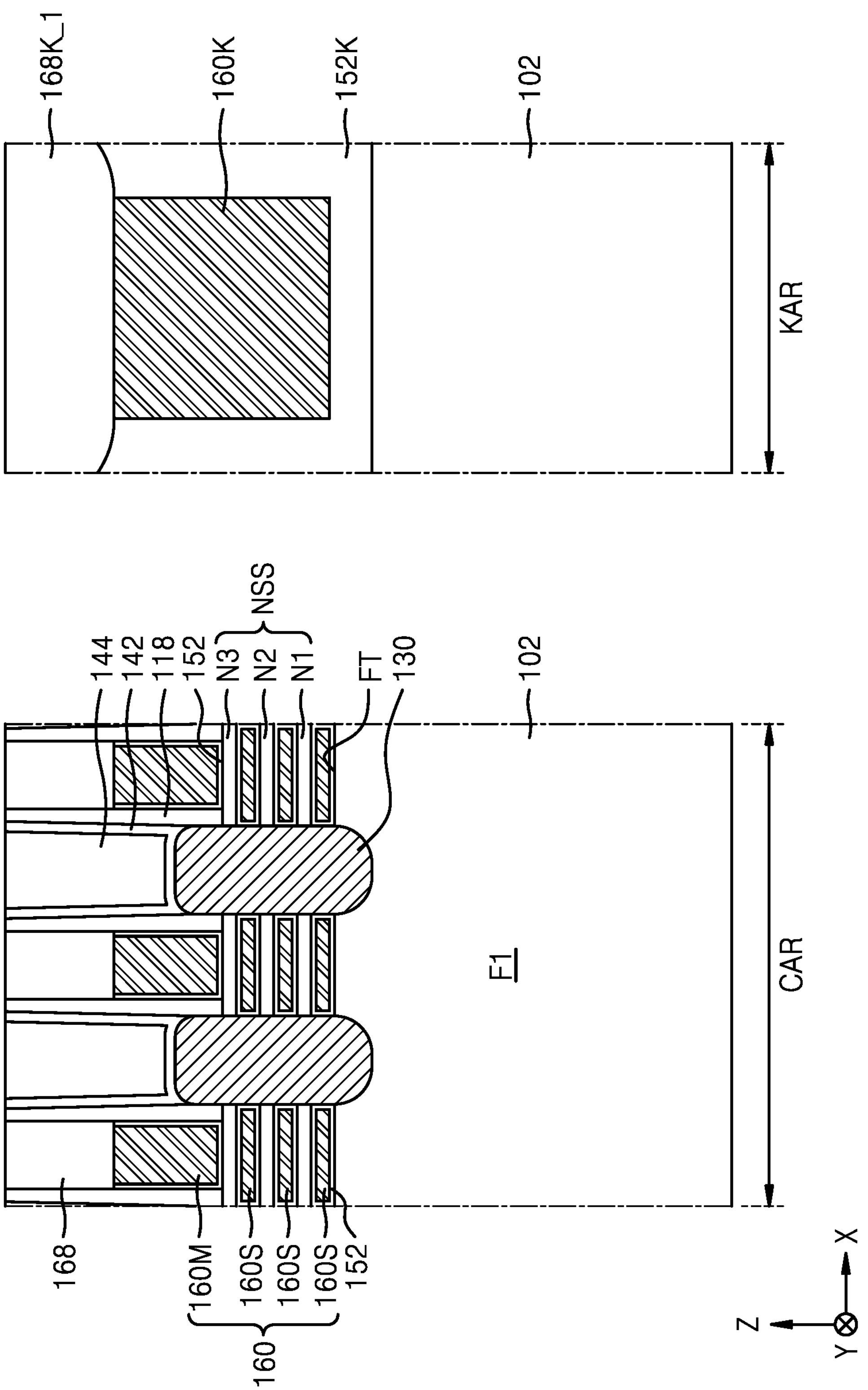
FIGS. 14A, 14B, 14C, and 14D are cross-sectional views illustrating an integrated circuit device manufacturing method according to a comparative example for comparison with an integrated circuit device manufacturing method according to some embodiments of the present inventive concept.
Figure 14B:
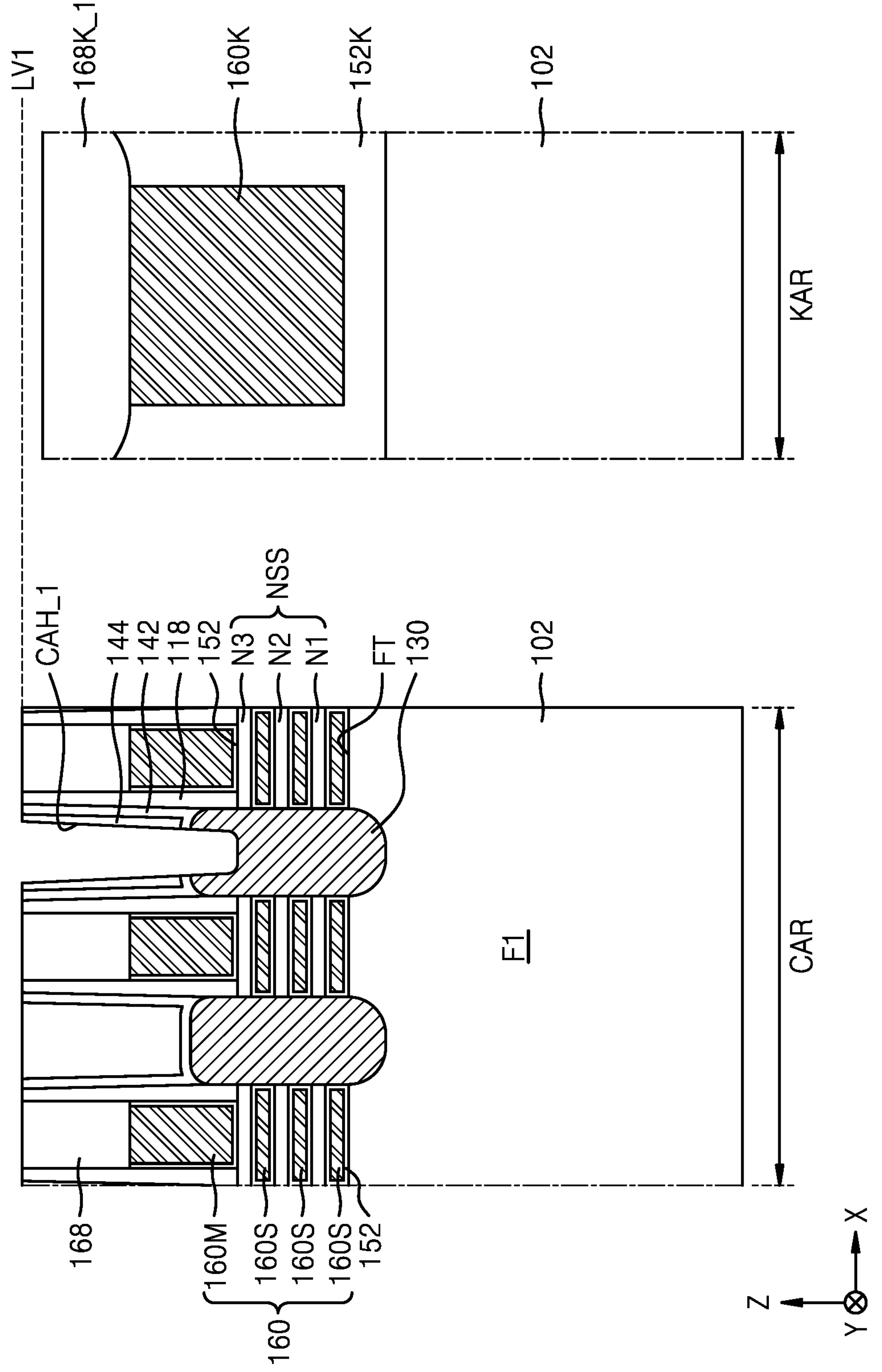

Referring to FIGS. 14A and 14B, comparison source/drain contact holes CAH_1 may be formed by etching portions of inter-gate insulating layers 144, insulating liners 142, and source/drain regions 130 in a chip region CAR. In this case, in a key region KAR, portions overlapping gate alignment keys 160K in a vertical direction (e.g., the Z direction) may be etched.

For example, a layout designed to manufacture the integrated circuit device 100_1 according to the comparative example may include contact alignment key patterns that overlap gate alignment key patterns, but might not include contact cut patterns that are for cutting the gate alignment key patterns. Thus, trenches may be formed by etching the second comparison insulating patterns 168K_1 that overlap the gate alignment keys 160K in the vertical direction (e.g., the Z direction) in the key region KAR of the integrated circuit device 100_1. In some embodiments of the present inventive concept, the depths of the trenches formed by etching the second comparison insulating patterns 168K_1 in the key region KAR may be less than the depths of the comparison source/drain contact holes CAH_1 of the chip region CAR. In some embodiments of the present inventive concept, due to the etching, upper surfaces of the second insulating patterns 168K_1 of the key region KAR may be lower than a vertical level LV1 of upper surfaces of the capping insulating patterns 168 of the chip region CAR.

Figure 14C:
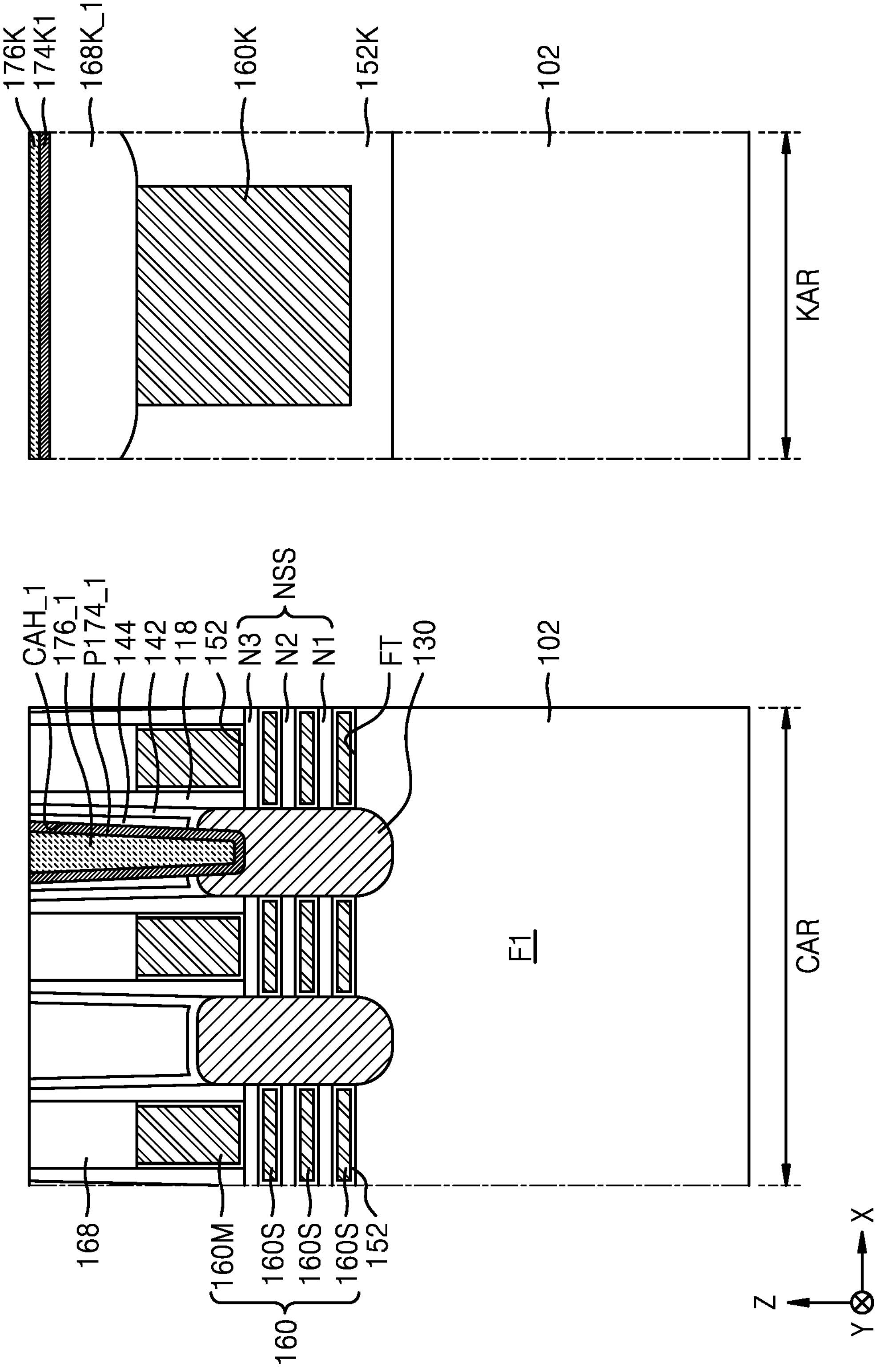

Next, referring to FIG. 14C, comparison pre-conductive barrier patterns P174_1 and comparison contact plugs 176_1 may be formed in the comparison source/drain contact holes CAH_1 of the chip region CAR. In this case, first comparison conductive patterns 174K1 and second comparison conductive patterns 176K may be formed in trenches formed by etching the second comparison insulating patterns 168K_1 in the key region KAR.

Figure 14D:
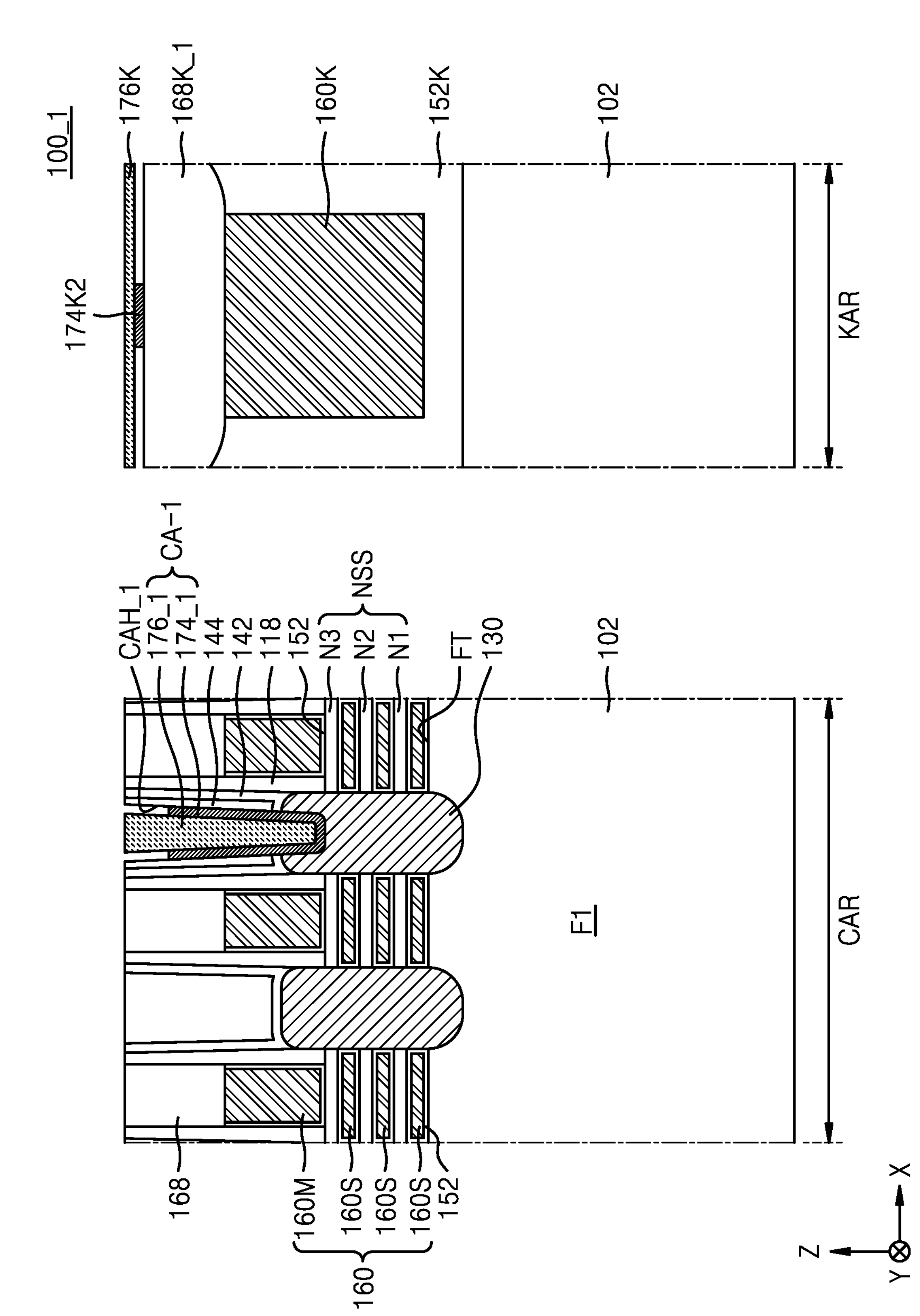

Next, referring to FIG. 14D, portions of the comparison pre-conductive barrier patterns P174_1 disposed on upper portions of lateral surfaces of the comparison source/drain contact holes CAH_1 of the chip region CAR may be removed. Through this, comparison contacts CA_1 including the comparison conductive barrier patterns 174_1 and the comparison contact plugs 176_1 may be formed. In this case, portions of the first comparison conductive patterns 174K1 of the key region KAR may be removed together. For example, portions of the first comparison conductive patterns 174K1 disposed under the second comparison conductive patterns 176K may be removed, and thus, portions of the second comparison conductive patterns 176K may be lifted in the integrated circuit device 100_1 of the comparative example. For example, after removal of portions of the first comparison conductive pattern 174K1, a third comparison conductive pattern 174K2 may remain under the second comparison conductive patterns 176K. For example, the integrated circuit device 100_1 of the comparative example may be defective because of lifting of the second comparison conductive patterns 176K.

However, according to the integrated circuit device manufacturing method of the embodiments described with reference to FIG. 13, contact alignment keys overlapping the gate alignment keys 160K might not be formed, and thus, lifting of the contact alignment keys might not occur in a subsequent process. In addition, according to the integrated circuit device manufacturing method of the embodiments described with reference to FIG. 13, errors might not occur due to lifting of contact alignment keys overlapping the gate alignment keys 160K.

While the present inventive concept has been described with reference to example embodiments thereof, it will be understood by those of ordinary skill in the art that various changes in form and details may be made thereto without departing from the spirit and scope of the present inventive concept.

What is claimed is:

1. A layout design method comprising:

designing a gate layout comprising a gate pattern in a first region and a gate alignment key pattern in a second region;

designing a contact layout comprising a contact pattern in a first region and a contact alignment key pattern in a second region; and designing a contact cut layout comprising a contact cut pattern for cutting a portion of the contact pattern and for cutting a portion of the contact alignment key pattern, wherein the contact alignment key pattern comprises a gate-contact overlay pattern that overlaps the gate alignment key pattern, and the contact cut pattern comprises a gate-contact overlay cut pattern that overlaps the gate-contact overlay pattern.

2. The layout design method of claim 1, wherein the designing of the contact cut layout comprises copying the gate-contact overlay pattern.

3. The layout design method of claim 2, wherein the designing of the contact cut layout further comprises forming the gate-contact overlay cut pattern by pasting the copied gate-contact overlay pattern on the contact cut layout at a position that overlaps the gate-contact overlay pattern.

4. The layout design method of claim 1, wherein a size of the gate-contact overlay cut patterns is greater than or equal to a size of the gate-contact overlay pattern.

5. The layout design method of claim 1, wherein the gate pattern and the contact pattern do not overlap each other in a vertical direction.

6. The layout design method of claim 1, wherein the first region of the gate layout corresponds to the first region of the contact layout, and the second region of the gate layout corresponds to the second region of the contact layout.

7. An integrated circuit device manufacturing method comprising:

designing a layout;

fabricating a photomask by using the designed layout; and forming a gate alignment key and a contact alignment key on a substrate by using the photomask, wherein the designing of the layout comprises:

designing a gate layout comprising a gate alignment key pattern;

designing a contact layout comprising a contact alignment key pattern; and designing a contact cut layout comprising a contact cut pattern for cutting a portion of the contact alignment key pattern, and wherein the contact alignment key pattern comprises a gate-contact overlay pattern that overlaps the gate alignment key pattern, and the contact cut pattern comprises a gate-contact overlay cut pattern that overlaps the gate-contact overlay pattern.

8. The integrated circuit device manufacturing method of claim 7, wherein the fabricating of the photomask comprises:

forming a first contact mask by transferring the contact alignment key pattern; and forming a contact cut block by using the contact cut layout, and wherein the forming of the gate alignment key and the contact alignment key comprises forming the gate alignment key by transferring the gate alignment key pattern.

9. The integrated circuit device manufacturing method of claim 8, wherein the first contact mask comprises a first hole, which overlaps the gate alignment key in a vertical direction, and a second hole, which does not overlap the gate alignment key in the vertical direction.

10. The integrated circuit device manufacturing method of claim 9, wherein the first hole corresponds to the gate-contact overlay pattern.

11. The integrated circuit device manufacturing method of claim 9, wherein a portion of the contact cut block is formed in the first hole.

12. The integrated circuit device manufacturing method of claim 11, wherein the portion of the contact cut block formed in the first hole corresponds to the gate-contact overlay cut pattern.

13. The integrated circuit device manufacturing method of claim 8, wherein the forming of the gate alignment key and the contact alignment key further comprises forming the contact alignment key by using a second contact mask.

14. The integrated circuit device manufacturing method of claim 13, wherein the second contact mask is formed by disposing a portion of the contact cut block in a first hole of the first contact mask, wherein the first hole overlaps the gate alignment key in a vertical direction.

15. The integrated circuit device manufacturing method of claim 7, wherein the contact layout comprises a portion that does not correspond to the contact alignment key, and the portion of the contact layout comprises the gate-contact overlay pattern.

16. An integrated circuit device manufacturing method comprising:

designing a layout;

forming a gate alignment key in a key region of a substrate by using the designed layout, wherein the substrate comprises a chip region and the key region adjacent to the chip region; and forming a contact alignment key in the key region of the substrate by using the designed layout, wherein the designing of the layout comprises:

designing a gate layout comprising a gate pattern in a first region, which corresponds to the chip region, and a gate alignment key pattern in a second region, which corresponds to the key region;

designing a contact layout comprising a contact pattern in a first region, which corresponds to the chip region, and a contact alignment key pattern in a second region, which corresponds to the key region; and designing a contact cut layout comprising a contact cut pattern for cutting a portion of the contact pattern and for cutting a portion of the contact alignment key pattern, wherein the contact alignment key pattern comprises a gate-contact overlay pattern that overlaps the gate alignment key pattern, wherein the contact cut pattern comprises a gate-contact overlay cut pattern that overlaps the gate-contact overlay pattern, and wherein the forming of the contact alignment key comprises:

forming a first mask in the key region of the substrate by using the contact alignment key pattern of the contact layout; and forming a contact cut block in the key region of the substrate by using the contact cut layout, and wherein the first mask comprises a first hole, which overlaps the gate alignment key in a vertical direction, and a second hole, which does not overlap the gate alignment key in the vertical direction, and at least a portion of the contact cut block is formed in the first hole to form a second mask.

17. The integrated circuit device manufacturing method of claim 16, wherein the first hole corresponds to the gate-contact overlay pattern, and the at least a portion of the contact cut block, which is formed in the first hole, corresponds to the gate-contact overlay cut pattern.

18. The integrated circuit device manufacturing method of claim 16, wherein the forming of the contact alignment key comprises forming the contact alignment key by using the second mask.

19. The integrated circuit device manufacturing method of claim 16, wherein the forming of the contact alignment key comprises:

forming a contact alignment key hole in the key region by using the second mask;

forming a conductive liner that conformally covers lateral and lower surfaces of the contact alignment key hole;

forming a conductive plug on the conductive liner that fills the contact alignment key hole; and removing a portion of the conductive liner disposed on an upper portion of the lateral surface of the contact alignment key hole, wherein the contact alignment key does not overlap the gate alignment key in the vertical direction.

20. The integrated circuit device manufacturing method of claim 16, wherein a size of the gate-contact overlay cut pattern is greater than or equal to a size of the gate-contact overlay pattern.

* * * * *